United States Patent
Wilson et al.

(10) Patent No.: US 11,410,159 B2
(45) Date of Patent: Aug. 9, 2022

(54) UPGRADEABLE SECURITY TOKEN

(71) Applicant: tZERO IP, LLC, New York, NY (US)

(72) Inventors: Justin Wilson, Draper, UT (US); Nicole Sanders, Cottonwood Heights, UT (US); Robert Christensen, Sandy, UT (US); Chase Lester, West Jordan, UT (US); Andrew Warner, Midvale, UT (US)

(73) Assignee: tZERO IP, LLC, New York, NY (US)

( * ) Notice: Subject to any disclaimer, the term of this patent is extended or adjusted under 35 U.S.C. 154(b) by 213 days.

(21) Appl. No.: 16/536,963

(22) Filed: Aug. 9, 2019

(65) Prior Publication Data
US 2020/0051069 A1 Feb. 13, 2020

Related U.S. Application Data

(60) Provisional application No. 62/881,121, filed on Jul. 31, 2019, provisional application No. 62/871,543, (Continued)

(51) Int. Cl.
*G06Q 20/36* (2012.01)
*H04L 9/40* (2022.01)
(Continued)

(52) U.S. Cl.
CPC ....... *G06Q 20/367* (2013.01); *G06F 16/1834* (2019.01); *G06Q 20/0658* (2013.01);
(Continued)

(58) Field of Classification Search
None
See application file for complete search history.

(56) References Cited

U.S. PATENT DOCUMENTS 8,140,420 B2* 3/2012 Buckwaiter ............ G06Q 40/00
705/36 R
2011/0022521 A1* 1/2011 Collinge ............ G06Q 20/3674
705/67
(Continued)

FOREIGN PATENT DOCUMENTS

CN 108170740 A 6/2018
CN 107145521 B 5/2019
(Continued)

OTHER PUBLICATIONS

International Searching Authority, "International Search Report and Written Opinion from PCT Application No. PCT/US2019/045908", from Foreign Counterpart to U.S. Appl. No. 16/536,963, dated Dec. 12, 2019, pp. 1-13, Published: WO.
(Continued)

*Primary Examiner* — Neha Patel
*Assistant Examiner* — Nicholas K Phan
(74) *Attorney, Agent, or Firm* — Fogg & Powers LLC

(57) ABSTRACT

A network node that includes at least one processor, at least one memory, and at least one network interface. The network node is configured to be within a plurality of network nodes communicatively coupled in a peer-to-peer network of network nodes implementing a distributed ledger. The network node is communicatively coupled to at least one remotely located computing device through the at least one network interface. The at least one processor is configured to deploy a child smart contract, which is a subsequent version of a parent smart contract, on the distributed ledger. The at least one processor is also configured to set an upgraded address field in the parent smart contract to point to an address of the child smart contract. The parent smart contract remains deployed after the child smart contract is deployed.

25 Claims, 9 Drawing Sheets

Related U.S. Application Data filed on Jul. 8, 2019, provisional application No. 62/717,575, filed on Aug. 10, 2018.

(51) Int. Cl.
  *H04L 9/32* (2006.01)
  *G06Q 20/06* (2012.01)
  *G06Q 20/38* (2012.01)
  *G06F 16/182* (2019.01)
  *G06Q 20/40* (2012.01)

(52) U.S. Cl.
  CPC ....... *G06Q 20/3672* (2013.01); *G06Q 20/389* (2013.01); *G06Q 20/405* (2013.01); *H04L 9/3236* (2013.01); *H04L 63/20* (2013.01); *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 2012/0226776 | A1 | 9/2012 | Keebler et al. |
| 2016/0321434 | A1 | 11/2016 | McCoy et al. |
| 2016/0321435 | A1 | 11/2016 | McCoy et al. |
| 2017/0076382 | A1* | 3/2017 | Dintenfass .............. G06Q 40/06 |
| 2017/0118095 | A1* | 4/2017 | Konecny ................. H04L 67/10 |
| 2019/0044714 | A1* | 2/2019 | Parker ................. G06F 16/1805 |
| 2019/0287107 | A1* | 9/2019 | Gaur .................... G06Q 20/407 |
| 2019/0325044 | A1* | 10/2019 | Gray ..................... G06F 16/284 |
| 2019/0333033 | A1* | 10/2019 | Finlow-Bates ......... H04L 63/10 |
| 2021/0082045 | A1* | 3/2021 | Assia .................. G06F 16/2379 |

FOREIGN PATENT DOCUMENTS

| | | |
|---|---|---|
| TW | 201828215 A | 8/2018 |
| WO | 2018065411 A1 | 4/2018 |
| WO | 2018127923 A1 | 7/2018 |

OTHER PUBLICATIONS

Peyrott, "An Introduction to Ethereum and Smart Contracts: a Programmable Blockchain", Ethereum, Mar. 28, 2017, pp. 1-38, https://auth0.com/blog/an-introduction-to-ethereum-and-smart-contracts-part-2/.
"GAS explosion as NEO not divisible", NEO, 2018 or at least as early as Jun. 13, 2019, pp. 1-4.
"GoChain Development Updates—Upgradable Smart Contracts & Development Insights", GoChain, Dec. 31, 2018, pp. 1-4.
"Introduction to Smart Contracts A Simple Smart Contract", Solidity 0.509 documentation, at least as early as Jun. 17, 2019, pp. 1-11.
"List of All Functions", robin-stocks 1.0.0 documentation, at least as early as Jun. 13, 2019, pp. 1-14.
"Trading Glossary", TradeStation, at least as early as Jun. 13, 2019, pp. 1-29.
Araoz, "Proxy Libraries in Solidity", Zeppelin Blog, Mar. 6, 2017, pp. 1-6.
Augustol, "ERC930—Eternal Storage Standard", ethereum/EIPs, Mar. 14, 2018, pp. 1-7, Issue #930, GitHub.
Bayequentist, "Will the total supply of IOTA tokens ever increase?" Iota Beta, Nov. 30, 2017, pp. 1-3.
Beers, "Understand the What and Why of Stock Splits", Stock Trading Strategy & Education, Apr. 25, 2019, pp. 1-8, Investopedia.
Chawla, "How to write upgradeable contracts in solidity!", Apr. 25, 2018, pp. 1-15.
EditorDavid, "Could Blockchain-Based Fractions of Digitized Stocks Revolutionize Markets", Slashdot, Mar. 10, 2019, pp. 1-14.
Eha, "Capital markets foe seeks an end run via blockchain", American Banker, Jan. 5, 2018, pp. 1-9.
Ganti, "Reverse Stock Split", Corporate Finance & Accounting, Apr. 1, 2019, pp. 1-8, Investopedia.
Gucluturk, "The DAO Hack Explained: Unfortunate Take-off of Smart Contracts", at least as early as Jun. 17, 2019, pp. 1-8.
Hamlin, "This Week in Blockfolio Signal", Blockfolio Blog, Apr. 26, 2019, pp. 1-11.
Haris, "Upgradable Smart Contracts Made Easy", Hacker Noon, Oct. 19, 2018, pp. 1-10.
Nadolinski et al., "Proxy Patterns", ZeppelinOS Blog, Apr. 19, 2018, pp. 1-16.
Palladino, "Malicious backdoors in Ethereum Proxies", Nomic Labs, Jun. 1, 2018, pp. 1-8.
PeteThomas, "Blockchain startup R3 sues competitor Ripple", Hacker News Sep. 8, 2017, pp. 1-8.
Reeder, "Upgradeable Smart Contracts are Here!", GoChain, at least as early as Jun. 17, 2019, pp. 1-5.
Reeder, "Upgradeable Smart Contracts", gochain/gip, Aug. 2, 2018, pp. 1-2, Issue #22, GitHub.
Sag, "Delaware General Corporations Law (DGCL) compatible share token", GitHub, Feb. 14, 2018, pp. 1-6.
Spagnuolo, "Upgradeability using Unstructured Storage", Technical, Apr. 13, 2018, pp. 1-8, ZeppelinOS Blog.
Tanner, "Summary of Ethereum Upgradeable Smart Contract R&D", Indorse, Mar. 5, 2018, pp. 1-9.
Vogelsteller, "ERC-20 Token Standard", Nov. 19, 2015, pp. 1-4, GitHub.
European Patent Office, "Extended European Search Report from EP Application No. 19846245.9", from Foreign Counterpart to U.S. Appl. No. 16/536,963, dated May 3, 2022, pp. 1 through 8, Published: EP.

* cited by examiner

| TABLE OF BALANCES 105A | |
|---|---|
| A | 100 |
| B | 150 |
| C | 200 |
| | |
| | |

| TABLE OF BALANCES 105B | |
|---|---|
| | |
| | |
| | |
| | |
| ISSUER | 450 |

*FIG. 4A*

| TABLE OF BALANCES 105A | |
|---|---|
| | |
| B | 150 |
| C | 200 |
| D | 100 |
| | |

| TABLE OF BALANCES 105B | |
|---|---|
| A | 100 |
| | |
| | |
| | |
| ISSUER | 350 |

*FIG. 4B*

| TABLE OF BALANCES 105A | |
|---|---|
| | |
| | |
| C | 200 |
| D | 250 |
| | |

| TABLE OF BALANCES 105B | |
|---|---|
| A | 100 |
| B | 150 |
| | |
| | |
| ISSUER | 200 |

*FIG. 4C*

| TABLE OF BALANCES 105A | |
|---|---|
| | |
| | |
| | |
| D | 450 |
| | |

| TABLE OF BALANCES 105B | |
|---|---|
| A | 100 |
| B | 150 |
| C | 200 |
| | |
| ISSUER | 0 |

*FIG. 4D*

UPGRADEABLE SECURITY TOKEN

CROSS-REFERENCE TO RELATED APPLICATIONS

This application claims the benefit of U.S. Provisional Patent Application Ser. No. 62/717,575 (Attorney Docket 270.023USPR) filed on Aug. 10, 2018, entitled "SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS"; U.S. Provisional Patent Application Ser. No. 62/871,543 (Attorney Docket 270.032USPR) filed on Jul. 8, 2019, entitled "SPLITTABLE SECURITY TOKEN"; and U.S. Provisional Patent Application Ser. No. 62/881,121 (Attorney Docket 270.033USPR) filed on Jul. 31, 2019, entitled "UPGRADEABLE SECURITY TOKEN"; all of which are hereby incorporated herein by reference.

This application is related to the following co-pending United States patent applications, which are hereby incorporated herein by reference:

U.S. patent application Ser. No. 16/536,940 entitled "SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS" and filed on even date herewith, which is hereby incorporated herein by reference; and U.S. patent application Ser. No. 16/536,866 entitled "SPLITTABLE SECURITY TOKEN" and filed on even date herewith, which is hereby incorporated herein by reference.

BACKGROUND

Cryptographic tokens are used in connection with various aspects of blockchains. In examples, smart contracts implemented on an Ethereum blockchain enable the creation and issuance of tokens with complex behaviors attached to them. Ethereum Request for Comments 20 (ERC20) is a technical standard used for smart contracts (on the Ethereum blockchain) implementing tokens. The ERC20 standard is incorporated by reference in its entirety. Additionally, other methods may be implemented in order to satisfy Title 8 of the Delaware Code Relating to the General Corporation Law.

SUMMARY

A network node that includes at least one processor, at least one memory, and at least one network interface. The network node is configured to be within a plurality of network nodes communicatively coupled in a peer-to-peer network of network nodes implementing a distributed ledger. The network node is communicatively coupled to at least one remotely located computing device through the at least one network interface. The at least one processor is configured to deploy a child smart contract, which is a subsequent version of a parent smart contract, on the distributed ledger. The at least one processor is also configured to set an upgraded address field in the parent smart contract to point to an address of the child smart contract. The parent smart contract remains deployed after the child smart contract is deployed.

DRAWINGS

Understanding that the drawings depict only exemplary embodiments and are not therefore to be considered limiting in scope, the exemplary embodiments will be described with additional specificity and detail through the use of the accompanying drawings, in which.

Figure 5:
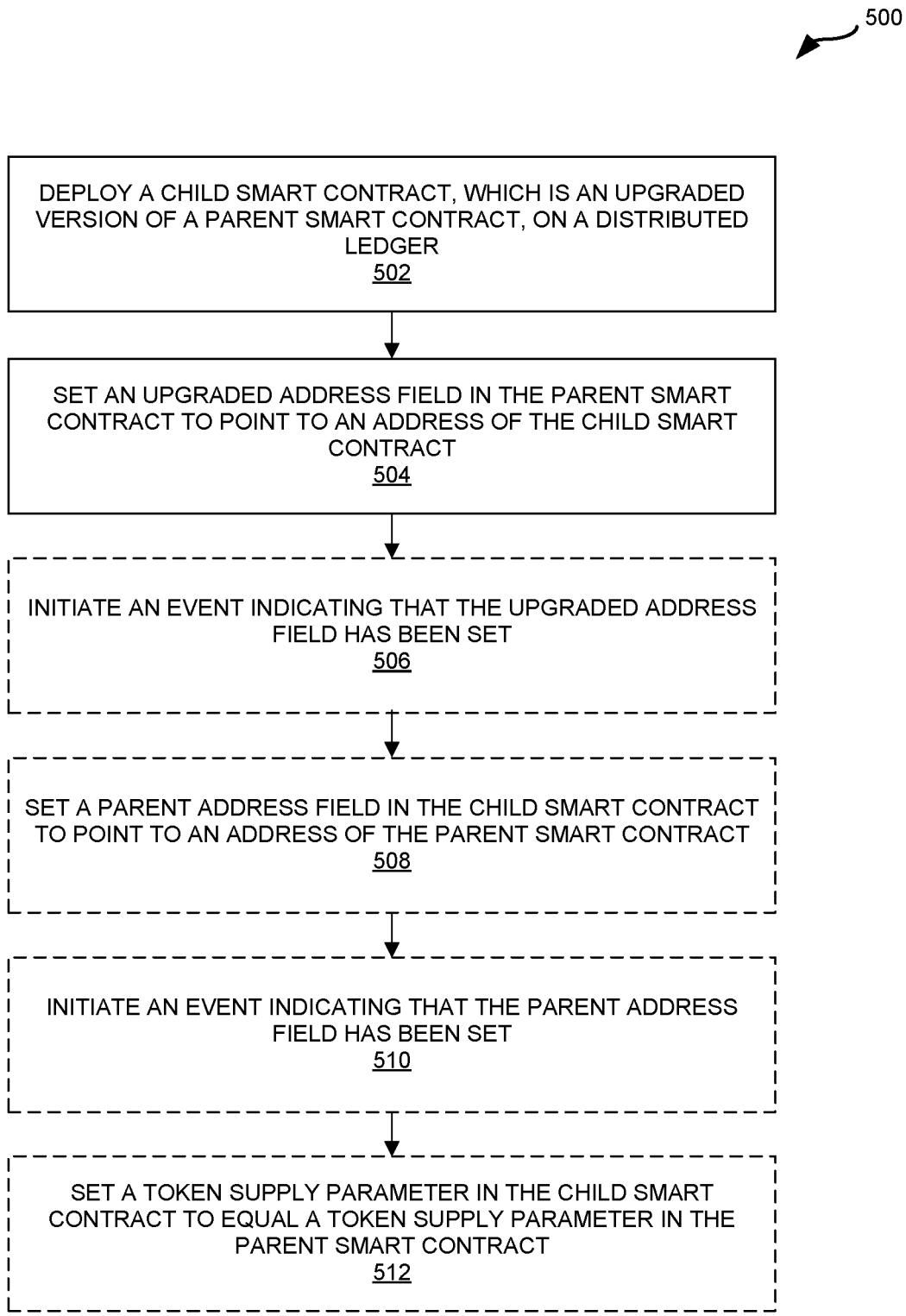
Figure 6:
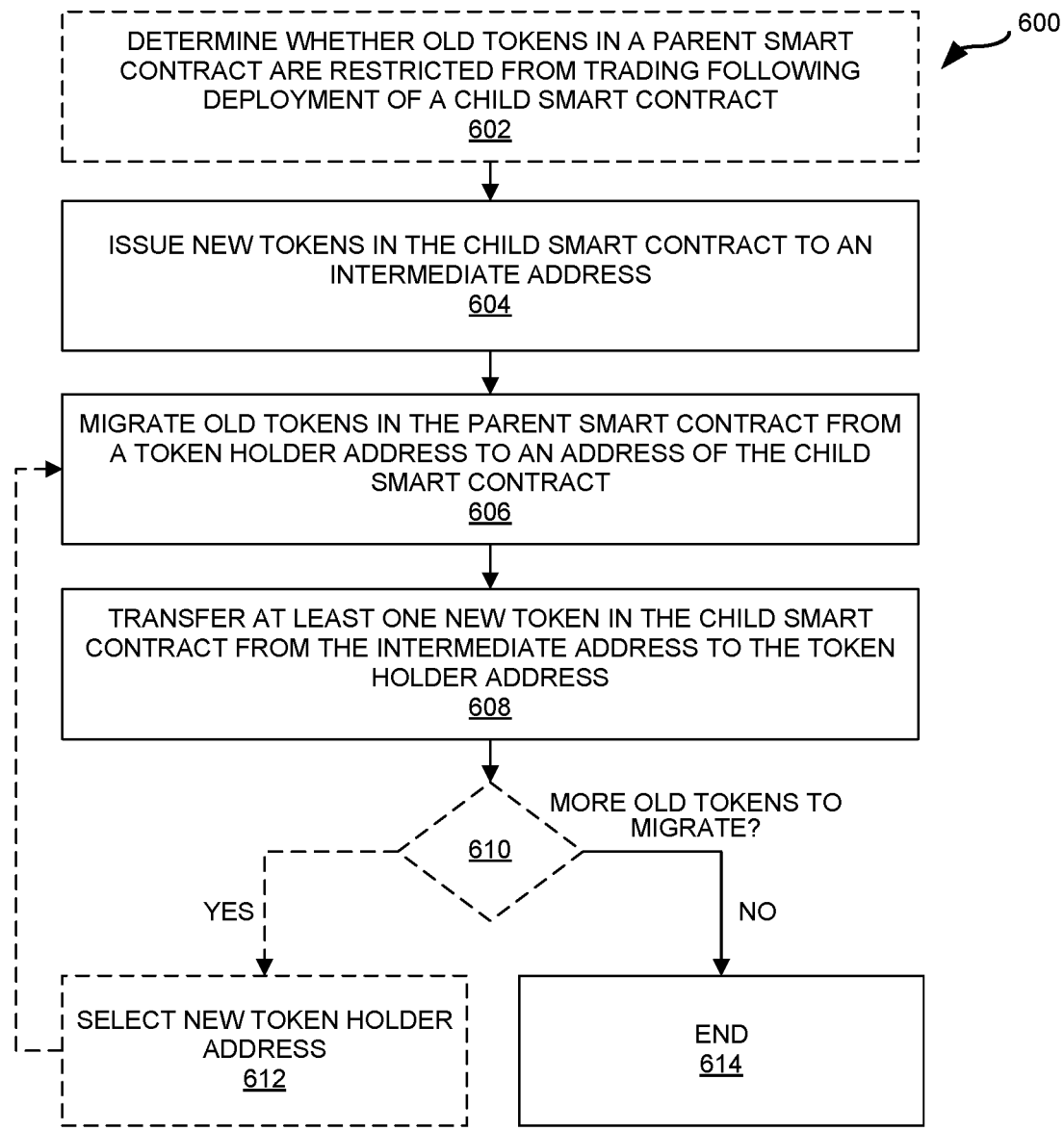
Figure 7:
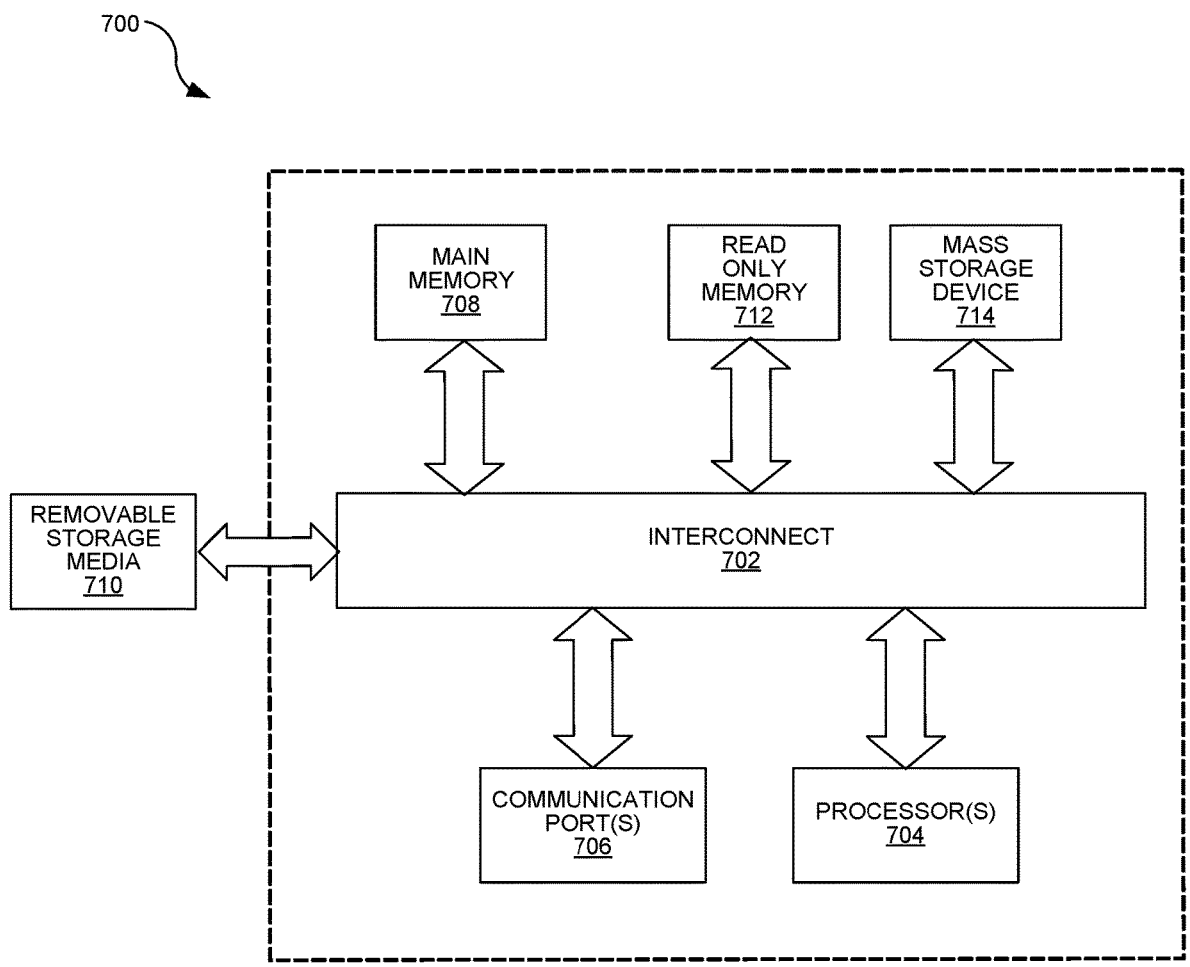
Figure 8:
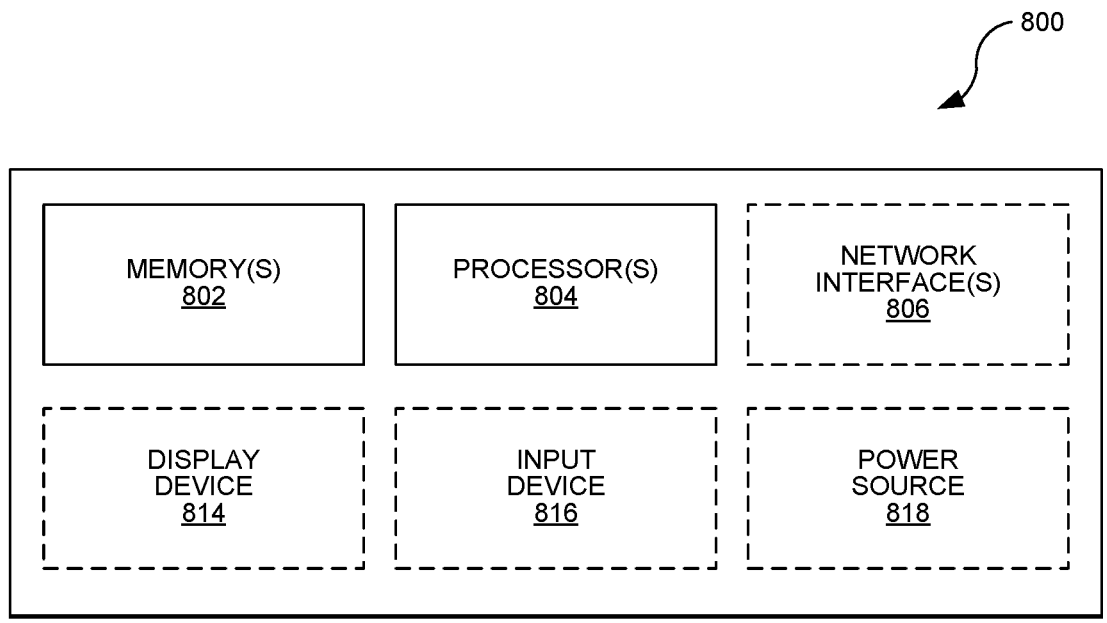

FIGS. 4A-D are block diagrams illustrating different stages of a migration of tokens to a subsequent version of a smart contract;

FIG. 5 is a flow diagram illustrating a method for deploying a child smart contract;

FIG. 6 is a flow diagram illustrating a method for migrating outstanding tokens in a parent smart contract to a child smart contract;

FIG. 7 is a block diagram illustrating an example computer system with which embodiments of the present disclosure may be utilized; and FIG. 8 is a block diagram illustrating another example computing device with which embodiments of the present disclosure may be utilized.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The term "smart contract" (or just "contract") refers to a set of conditional logic that may be implemented in software, e.g., one or more sequential steps that are executed in response to one or more relevant conditions being satisfied. A smart contract may be stored at an address of a distributed ledger. The smart contract may be invoked using the address of the smart contract. In examples, smart contracts may be programmed in the Solidity programming language. Smart contracts may be executed by a processor on a network node implementing a distributed ledger, e.g., a network node running a virtual machine, such as the Ethereum Virtual Machine (EVM).

One particular example of smart contract is a security token. In other words, a security token may be a type of smart contract, e.g., a cryptographic token that represents a security. The security token may be implemented as a smart contract on (e.g., stored on) a distributed ledger (e.g., a blockchain). Various aspects of a given security token (e.g., issuance, transfers, etc.) may be regulated by the Securities and Exchange Commission (SEC) or other regulatory body.

A security token may maintain state that indicates existing token holders, token balance(s) for address(es), total supply of tokens, etc. Therefore, in addition to referring to a smart contract, the terms "security token" or "token" can refer to state of the security token that represents a security, e.g., a share of stock. Generally, and without limitation, the term "security token" is used to refer to a smart contract, while the term "token" is used to refer to state of the security token, e.g., representing a share of stock.

A security may be any fungible, negotiable financial instrument that holds some type of monetary value. A security may represent an ownership position, a creditor relationship, or rights to ownership as represented by an option. Examples of securities include, without limitation, a piece of real property, at least one commodity, a piece of personal property, at least one bond, at least one derivative, at least one future, at least one fund, at least one currency fund, at least one exchange traded fund, at least one mutual fund, at least one index fund, at least one bond fund, at least one commodity fund, and/or at least one real estate fund.

More description of security tokens, including issuance, transfer, and regulations pertaining thereto, can be found in U.S. Provisional Application No. 62/717,575 filed on Aug. 10, 2018, entitled "SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS", the entirety of which is incorporated by reference herein.

A common difficulty in developing smart contracts (e.g., in Ethereum/Solidity) is how to upgrade them, fix bug(s), or do anything else that warrants a change of code within a smart contract. Conventional attempts at upgrading smart contracts emphasize preservation of the original address of the contract. Instead of preserving the contract address as the code changes, the present systems and methods focus on preserving the original code, with the ability to link old code with new code, while keeping a full, logical audit of the contract. Although this approach may be applied to any type of smart contract, one particularly useful configuration involves the upgrade path of a security token, e.g., including the state.

Two of the most important features of distributed ledger technology (DLT) and blockchain technologies are trust and auditability. Both of these features can be impacted by another all-too-often overlooked (and/or lacking) feature: maintainability. When a contract is not maintainable it will quickly lose credence when issues arise, features are lacking, or worse, if fraud and/or abuse occur. One of the most infamous issues is the well-known decentralized autonomous organization (DAO) attack, which raised concerns across the DLT community and muddied the waters of external observers.

No matter how well designed or tested they are, smart contracts are not immune to breaking, being abused, and/or being exploited. This lack of maintainability often goes unchecked because immutability is a new concept for many developers that are accustomed to re-deploying, applying hot-fixes/patches, and/or versioning code. By designing an upgrade path into smart contracts (and especially smart contracts implementing security tokens), the present systems and methods enable an issuer to make changes to the underlying code of their smart contract with low impact on users of the system.

By accepting that smart contracts will need to be updated, upgradeability can be designed up-front. As mentioned above, auditability is desirable in a smart contract. Accordingly, the upgradeable security token described herein enables different versions of a security token to be traversed in chronological ordering (similar to a linked list). This allows a clear ability to perform audits, while also providing an easy way to navigate the most current implementation when only knowledge of a superseded contract exists.

Additionally, it is also desirable to transition state from an old contract to a new contract by allowing holders of old token(s) in a parent contract to transfer their holdings to new token(s) in a descendant contract. This provides a couple of features to the upgrade path. First, token holdings of the old contract are sent to the address of its descendant, which essentially locks/burns/removes from circulation these tokens and provides an audit trail of when a holder moved their holdings, while maintaining the state information from the old contract. This may also expose whether a given contract is the most current, or where in the upgrade path it resides. Next, one can see who has decided to transition their holdings and who hasn't, giving control to the user as to whether or not they choose, or accept the updated changes. Instead of "parent" and "child" smart contracts, the terms "first" and "second" or "predecessor" and "successor" may alternatively be used.

One significant change with the upgradeable security token herein, when compared to conventional solutions, is that an asset/security token could potentially have multiple addresses. As long as there is an easy ability to traverse the history of a security token and find the active asset/security token, multiple addresses should not be a hurdle to use and implement.

With immutability being both a key concept within the blockchain space as well as being an obstacle with regards to maintainability, a number of attempts have been made at upgradable smart contracts within the Ethereum ecosystem. One shared concept among many solutions is a fixed, unchanging contract address (in contrast to the present systems and methods).

Specifically, the "proxy pattern" is emerging as a popular solution to the unique obstacles immutability provides, although implementations tend to also use a form of eternal storage, hub and spoke, or other means to preserve stored data. The proxy pattern is a single proxy contract whose sole purpose is to hold the address of the current implementation of a contract. The proxy contract may be called using a low level Solidity opcode (delegatecall), where the proxy contract passes the address of the initiator to the actual implementation of the contract. In this way, the address of the proxy contract doesn't change across upgrades. Instead, to upgrade a contract, the new code is deployed and the address field held within the proxy contract is updated to point to the newly deployed version containing the changes. This is convenient for the maintenance until a bug or other issue is discovered within the implementation of the proxy contract. If vulnerabilities are discovered in the proxy contract, it can prevent adoption.

A second potential issue arises around the trust of a proxied contract. The pointer within the proxy contract may change at any given moment, essentially circumventing the immutable nature of blockchain while obscuring transparency. The present systems and methods address these shortcomings by preserving the full upgrade history, while preventing functionality of a given address to alter from its initial state.

The examples described herein may be compatible with a custodial model where custodians hold tokens on behalf of investors and/or broker dealers. However, the systems herein are also compatible with non-custodial models, e.g., where investors and/or broker dealers hold their tokens directly with fewer or no intermediaries.

Various method names may be used herein as examples. It should be appreciated that any method names are illustrative in purpose, and not limiting. Additionally, optional devices and method steps are indicated with dashed lines in the Figures.

Figure 1:
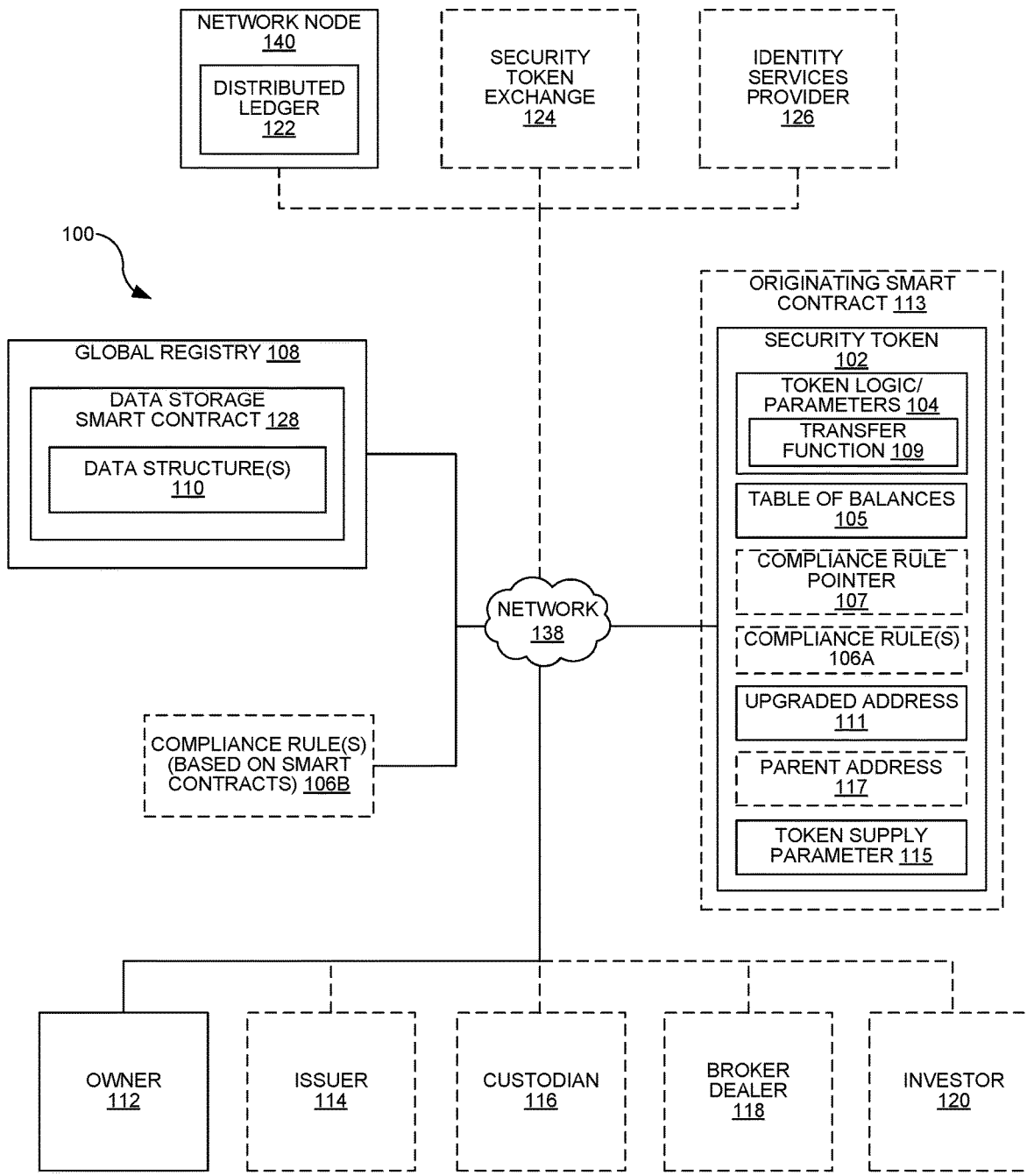
FIG. 1 is a block diagram of an example system using smart-contract-based security tokens that are upgradeable.

FIG. 1 is a block diagram of an example system 100 using smart-contract-based security tokens 102 that are upgradeable. The system 100 may include one or more security tokens 102, a system owner 112, an issuer 114, and at least one network node 140 implementing a distributed ledger 122. The system 100 may also include various optional entities and/or devices, as described below.

In examples, each token in a security token 102/smart contract may represent a single share of a company. The security token 102 may be implemented on (e.g., stored on) a distributed ledger 122 (e.g., a blockchain). The security token 102 may be implemented using one or more smart contracts. The security token 102 may store an indication of its own state, e.g., how many tokens have been issued, what addresses hold how many tokens, etc.

An investor 120 may be a person or entity that has previously, or is considering, receiving or transferring a token. In examples, an investor 120 may be a customer of a broker dealer 118 (or directly of the custodian 116), where the investor 120 may send orders to the broker dealer 118 (or directly to the custodian 116) relating to the purchase and/or sale of one or more tokens. Alternatively, an investor 120 may be an "external investor" that does not need to connect to a broker dealer 118 or a custodian 116. Instead, an external investor may call the relevant methods described herein to initiate token transactions, e.g., methods in the token 102/smart contract itself and/or the global registry 108, described below.

The term "token transaction" or similar refers to any transfer of a security token 102, and may be used to describe an issuance, offering, gift, purchase, sale, and/or employee compensation carried out with the transfer of the token. A token 102 transaction may transfer a quantity of tokens from one or more input addresses (belonging to one or more investors 120, broker dealers 118, and/or custodians 116) to at least one output address (belonging to one or more investors 120, broker dealers 118, and/or custodians 116). As used herein, the terms "buyer" and "seller" refer to investors 120 that are transferring and receiving a token, respectively. Token transactions may be performed on-exchange or off-exchange.

The broker dealer 118 in the system 100 may be a person or entity that purchases or sells tokens for its own account and/or on behalf of its customers. During onboarding, a broker dealer 118 may create an account for a new customer, including collection of information, e.g., a broker dealer 118 may onboard an investor 120 as a new customer. This may include performing anti-money laundering and/or know-your-customer (AML/KYC) checks on its customers, e.g., provided by an identity services provider 126.

The issuer 114 may be a person or entity that instructs the owner 112 to issue tokens, i.e., the owner 112 may own one or more originating smart contracts 113 that deploy/issue security tokens 102. The system 100 may optionally include many issuers 114. In examples, the issuer 114 may be a company where each token in a security token 102 represents a share of the company.

The broker dealer 118 may have an account with a custodian 116, i.e., a person or entity that holds custody, possession, and/or ownership of tokens for one or more broker dealers 118. The custodian 116 may be a person or entity that holds custody, possession, and/or ownership of tokens on behalf of many broker dealers 118 (which broker dealers 118 may have many investors 120 as its customers). The system 100 may include many custodians 116 and/or many broker dealers 118.

An owner 112 may be a person or entity that owns, deploys, re-deploys, and/or transfers smart contracts in the system 100. In examples, the owner 112 may use a method call (e.g., that is executed by a virtual machine) to the originating smart contract 113 to deploy/issue security tokens 102. The owner 112 may also be referred to as the administrator of the system 100. The system 100 may only have a one or more owners 112. Optionally, the owner 112 may provide data services describing the "market" for a token based on the token transactions executed in the system 100, e.g., a feed indicating volume of token transactions, transaction price for the most recent token transaction, etc.

As described above, the terms owner 112, issuer 114, custodian 116, broker dealer 118, and investor 120 may refer to a person or entity filling the various roles in the system 100. Alternatively, these terms may refer to a computing device used by the owner 112, issuer 114, custodian 116, broker dealer 118, and investor 120, respectively. When referring to a computing device, each of the owner 112, issuer 114, custodian 116, broker dealer 118, and investor 120 may be implemented with one or more processors that execute instructions in a memory on the respective computing device. Each respective computing device may be a mobile device, such as a cell phone or tablet, personal computer, or a server configured to send and receive instructions and/or other data to other computing devices, e.g., via a network 138, such as the Internet.

A security token exchange 124 may be a marketplace or a business entity that operates the marketplace (or one or more computing devices operated by a security token exchange 124) in which security tokens 102, commodities, derivatives and/or other financial instruments are traded. In examples, the security token exchange 124 may record successfully executed transactions on the distributed ledger 122. The security token exchange 124 may be custodial, i.e., where custodians 116 hold and transact tokens on behalf of broker dealers 118 and/or investors 120.

The network node 140 may be a computing device implemented using one or more processors that execute instructions stored in memory to implement functionality described herein. In examples, a network node 140 may run a virtual machine (e.g., Ethereum Virtual Machine) that executes any of the smart contracts described herein.

The term "distributed ledger" refers to an electronic ledger that is distributed across multiple interconnected network nodes 140 (i.e., computing devices executing instructions stored in memory), where more than one of the network nodes 140 stores a copy of the distributed ledger 122. In examples, one or more network nodes 140 in a peer-to-peer network may implement the distributed ledger 122.

The distributed ledger 122 may implement one or more blockchains to validate the data stored within the distributed ledger 122. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger 122, and may be public (e.g., viewable by anyone) or private (e.g., viewable only to authorized users or entities). Exemplary blockchains include, but are not limited to, the Bitcoin blockchain, the Ethereum blockchain, BigchainDB, Billon, Chain, Corda, Credits, Elements, Monax, Fabric, HydraChain, Hyperledger, Multichain, Openchain, Quorum, Ravencoin, Sawtooth, and Stellar. Preferably, the distributed ledger 122 is the public Ethereum blockchain, however, other implementations are possible. If a private blockchain is used, a hash of the private blockchain may be periodically committed to (i.e., recorded on) a public blockchain, e.g., the Ethereum blockchain or Bitcoin blockchain.

Additionally, or alternatively, the distributed ledger 122 may implement a directed acyclic graph (DAG), e.g., IOTA or Hashgraph that uses a gossip protocol to share information between network nodes 140 of the system 100. Furthermore, consensus may be reached in the distributed ledger 122 without proof-of-work and can instead use proof-of-stake. Furthermore, any Merkle tree (or hash tree) that connects different sets of data using cryptographic hashes may be implemented by the distributed ledger 122.

The term "wallet" refers to a software program, digital file, and/or memory used to store and/or manage digital assets, such as tokens. Although the present systems and methods are described herein using tokens, they are also compatible with any type of digital asset. In examples, a wallet may be defined by one or more private keys, one or more public keys derived from one or more private keys, and/or one or more addresses derived from one or more private keys and/or one or more public keys. In examples, a wallet may be defined by one or more private account keys (and optional corresponding public account key(s)), each of which may have one or more child and/or grandchild transaction keys. The term "account" may be used to refer to an address on the distributed ledger 122, e.g., an Ethereum address in a hierarchical deterministic (HD) wallet.

Ethereum Request for Comments 20 (ERC20) is a standard defining a set of methods. To be compliant with ERC20, a cryptographic token (e.g., utility, cryptocurrency, or security) must implement these methods, although the owner of the security token 102 can implement the methods in their own way. One of the advantages of ERC20 is that each application, wallet, exchange, or interface doesn't have to be tailored to each specific security token 102. Rather, if a project supports the ERC20 standard, it may support many different ERC20 security tokens 102.

In order to comply with ERC20, the security token 102 may include token logic and/or parameters 104 that implements six required methods, including total Supply( ), balanceOf( ), transfer( ), transferFrom( ), approve( ), and allowance( ). These required methods describe how tokens can be transferred and how token-related data can be accessed. The token logic/parameters 104 may also implement various events to comply with ERC20, e.g., Transfer( ) and Approval( ). These events describe formatting guidelines for transfers and approvals.

The transfer( ) method/function 109 may be called when a token transaction is requested, and the transfer( ) method 109 may optionally call method(s) in one or more other smart contracts, e.g., in the token logic/parameters 104 and/or the global registry 108. The transfer( ) method 109 may be implemented in any suitable way that transfers token(s) from an input address to at least one output address.

The token logic/parameters 104 may also implement one or more optional methods to comply with ERC20, such as name( ), symbol( ), and/or decimals( ). These optional methods can be used to assign the security token 102 a name and a symbol, as well as define the number of decimals the security token 102 uses, respectively. These methods and events may be executed by a virtual machine (e.g., the Ethereum Virtual Machine) on a network node 140 and are further described in the ERC20 standard.

The token logic and/or parameters 104 may also include data that indicates the name of the security token 102, how many tokens of the same type were deployed or issued, and/or a symbol for the security token 102. In examples, the symbol of a security token 102 may be a multi-character (e.g., four or five) identifier for the security token 102 similar to a stock ticker symbol. The symbol of a security token 102 may be registered with Financial Industry Regulatory Authority (FINRA). The security token 102 symbol issued by a company may preferably be an extended version of the company's ticker symbol, e.g., by concatenating a particular character (e.g., Q, X, or Z) to the end of the company's ticker symbol.

The security token 102 may also include a table of balances 105, e.g., stored on a distributed ledger 122. The table of balances 105 may indicate balances of all holders of tokens, e.g., the table of balances 105 may indicate what addresses (e.g., Ethereum addresses) hold what quantity of tokens. Alternatively, instead of indexing by investor 120 (or custodian 116 or broker dealer 118) address, the table of balances 105 may be indexed in other ways, e.g., a hash of the investor's name, etc. The table of balances 105 for a security token 102 may be public, semi-public, or private, and may be anonymous such that balances of tokens held by a particular investor 120, custodian 116, or broker dealer 118 cannot be derived purely from publicly-available information.

The table of balances 105 may account for all tokens that have been deployed or issued. When a transfer of the token occurs (i.e., balances change), the table of balances 105 may be updated and distributed to each copy of the security token 102 stored on the different network nodes 140. In examples, the transfer of token(s) in a security token 102 may include updating the table of balances 105 in the security token 102. Table 1 is an example table of balances 105 that includes a key/value pair for each investor address:

TABLE 1

| Investor, Custodian, or Broker Dealer Address | Token Balance |
|---|---|
| 0x7d2a3d9f938e13cd947eb85a924bb34df8dd866 | 525 |
| 0x1d2a3d9f991e13c5da7ec05a1c7fe734df8dd84a | 50 |
| 0x1d2a3da66b8f13c5da7e9d5afc7fe734df8dd826 | 15000 |
| 0x1d2a3d9f938e13c4fa7ec0577c7fe734df8dd55e | 1100 |

In some examples, a table of balances 105 may be stored as a multi-object data structure (e.g., array) that is indexed by address (illustrated in the left column in Table 1) with the value at each index being a token balance (illustrated in the right column in Table 1) associated with the address.

In some configurations, the security token 102 may include a token supply parameter 115, e.g., that is stored on the distributed ledger 122. The token supply parameter 115 may indicate the total number of outstanding tokens. For example, the token supply parameter 115 may be the sum of token balances for all addresses in the table of balances 105 for the security token 102.

However, security tokens 102 (unlike other types of tokens) may be regulated by the Securities and Exchange Commission (SEC) in the United States. Accordingly, it may be desirable to satisfy Title 8 of the Delaware Code Relating to the General Corporation Law, which is important because many publicly traded companies are incorporated in Delaware. Additional methods satisfying Title 8 are referred to as Title 8 methods herein and may be implemented in a variety of ways, e.g., with or without Ethereum Request for Comments 884 (ERC884). Specifically, the Title 8 methods allows for the creation of tokens where each token represents a single share issued by a Delaware corporation, i.e., such tokens may be designed to represent equity issued by any Delaware corporation, whether private or public.

Accordingly, the token logic and/or parameters 104 may implement one or more Title 8 methods (beyond the six required by ERC20): including addVerified( ), removeVerified( ), updateVerified( ), cancelAndReissue( ), isVerified( ), isHolder( ), holderCount( ), holderAt( ), hasHash( ), isSuperseded( ), and/or getCurrentFor( ). The token logic/parameters 104 may also implement one or more events (beyond the six required for ERC20 compatibility), e.g., verifiedAddressAdded( ), VerifiedAddressRemoved( ), VerifiedAddressUpdate( ), and/or VerifiedAddressSuperseded( ). These Title 8 methods and events may be executed by a virtual machine on a network node 140.

However, SEC regulations impose additional requirements for security tokens 102 that are not required or enforced by ERC20 and/or the Title 8 methods. In order to self-enforce compliance with SEC regulations, the system 100 may implement functionality beyond the Title 8 methods. Specifically, one or more compliance rules 106A-B may ensure that any transaction involving the security token 102 complies with the relevant SEC regulations. In examples, the compliance rules 106 may (1) verify that the buyer and/or the seller of token(s) qualify under at least one of SEC Regulations A, D, and S; (2) verify that AML and/or KYC services have been performed for the buyer and/or seller; (3) verify that no freezes have been placed (discussed below) that would prevent the token from being transferred; and/or (4) verify that the particular security token 102 is not in a blackout period, i.e., a restriction that prevents the seller from selling tokens for a certain period of time (e.g., one year) following acquisition of the tokens.

In some configurations, the compliance rule(s) 106A may be stored in the security token (e.g., on the distributed ledger 122). Alternatively, the security token 102 may include at least one compliance rule pointer 107, where each compliance rule pointer 107 indicates the address of at least one external compliance rule 106B (that is implemented using one or more smart contracts). In this type of configuration, the at least one compliance rule pointer 107 may be updated, if necessary, to point to updated, external compliance rule(s) 106B.

At least one of the compliance rules 106 may reference the global registry 108 (that is external to the security token 102), i.e., at least one of the compliance rules 106 accesses information stored in a data storage smart contract 128. By storing the compliance rules 106 outside of the security token 102, the at least one compliance rule 106 may be updated without modifying the security token 102 itself, e.g., if SEC regulations change and the at least one compliance rule 106 need to be updated. Alternatively, the at least one compliance rule 106 may be included in the security token 102 itself, in which case modifying (e.g., destroying and re-deploying) at least one compliance rule 106 would require modifying the security token 102. Optionally, token transactions not using any compliance rules 106 are also possible, e.g., the default behavior might be to approve all transactions without respect to any compliance rules 106.

The global registry 108 may be a collection of smart contracts 128-134. The smart contracts 128-134 include a data storage smart contract 128 that stores data. The data stored in the data storage smart contract 128 may be relevant to compliance with SEC regulations (such as indications of whether an investor 120 qualifies under exemptions to the SEC Regulations); personally identifiable information (PII) of an investor 120; an indication whether AML/KYC has been performed for the investor 120; and/or whether a freeze has been placed on a security token 102, custodian 116, broker dealer 118, and/or investor 120.

A data structure 110 in the data storage smart contract 128 may store at least one investor element, each with information about a particular investor 120. Additionally, each investor element may include an address (e.g., Ethereum address) of the investor's broker dealer 118, and/or various regulatory accreditation information (such as whether AML/KYC has been performed for the investor 120, the investor 120 country of origin, length of time a particular token has been owned by the investor 120, etc.). The attributes in an investor element may include other information about the investor 120, e.g., collected by the broker dealer 118 during onboarding. Such information may include: customer name; tax identification number (e.g., Social Security number); address; telephone number; email address; date of birth; driver's license, passport information or information from other government-issued identification; employment status and occupation; whether the customer is employed by a brokerage firm; annual income; net worth; account investment objectives; and/or any other data that can be used to distinguish individual identity.

Figure 2A:
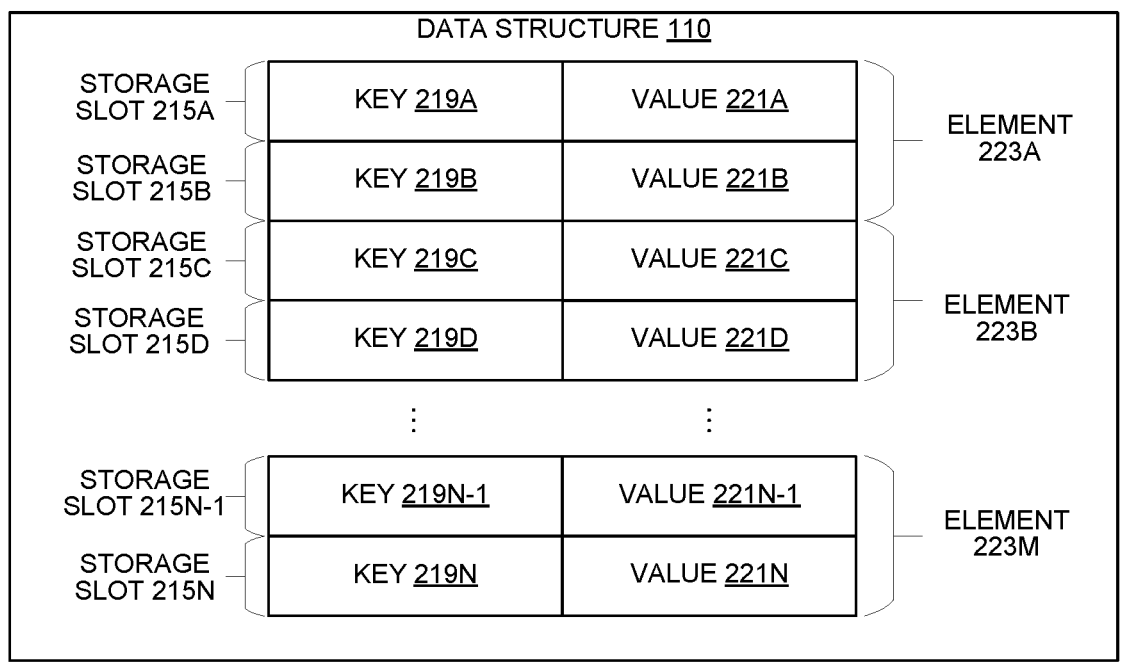
FIG. 2A is a block diagram illustrating a data structure used in the system illustrated in FIG. 1.

The attributes in an investor element (e.g., a value in a slot in an investor element) may be stored as comma-separated values, a hash table, a mapping, a dictionary, and/or key/value pairs, etc., e.g., as illustrated in FIG. 2A. Each investor element may be created by an owner 112, issuer 114, broker dealer 118, custodian 116, and/or an investor 120 (e.g., if the investor 120 is an external investor). The investor elements in the data storage smart contract 128 may be updated, as appropriate. For example, when the investor 120 closes their account with a broker dealer 118, the corresponding investor element may be removed from the data storage smart contract 128. Additionally or alternatively, the investor 120 may be responsible for creating, updating, and/or removing the attributes in the investor element 223 associated with itself, e.g., if an investor 120 is an external investor.

The data storage smart contract 128 may include an investor element for each instance of the investor 120 per broker dealer 118 that the investor 120 has an account with, i.e., the data storage smart contract 128 may store multiple investor elements for an investor 120 with accounts at multiple broker dealers 118. In examples, the investor element(s) for an investor 120 may only be created, updated, and/or removed by a broker dealer 118 that the investor 120 is associated with, however, other configurations are possible. Accordingly, each broker dealer 118 can preferably create, modify, or remove an investor element that is associated with investors 120 that are customers of the respective broker dealer 118.

Optionally, one or more other types of elements may be stored in the data storage smart contract 128 that include attributes about various actors in the system 100. In examples, the other elements (i.e., other than investor elements) may include at least one custodian element, at least one broker dealer element, and/or at least one security token element. In examples, the broker dealer element for a broker dealer 118 may only be created, updated, and/or removed by a custodian 116 that the broker dealer 118 is associated with, however, other configurations are possible. Optionally, an issuer element and/or security token exchange element may be stored for every issuer 114 and/or security token exchange 124 in the system. The attributes in one of the other elements (e.g., a value in a slot in an element) may be stored as comma-separated values, a hash table, a mapping, a dictionary, and/or key/value pairs, etc.

As described above, each smart contract (e.g., a security token 102) may be stored at an address that can be used to invoke the methods implemented by the smart contract. Conventional solutions to upgrading a smart contract maintain the same address for a smart contract before and after upgrade. For example, upgrading a smart contract via proxy pattern includes deploying (1) a proxy contract at an address that never changes; and (2) a non-proxy contract, which the proxy contract points to. The non-proxy contract implements the substantive functionality of the contract, while the proxy contract merely points to the address of the non-proxy contract (with little or no other functionality). During upgrade, the address the proxy contract points to is changed to a newly-deployed non-proxy contract, while the address of the proxy contract (the address by which the proxy contract is invoked) is unchanged.

In contrast, according to the present systems and methods, upgrading a first smart contract may include: (1) deploying a second smart contract and changing the address (in an upgraded address 111 field of the first smart contract) to point to the second smart contract; (2) issuing new tokens 102 in the second smart contract to an intermediate address (e.g., the issuer's address); (3) migrating old tokens 102 in the first smart contract (held in a set of token holder addresses) to the address of the second smart contract; and (4) transferring new tokens in the second smart contract from the intermediate address to the set of token holder addresses (that previously held old tokens 102 in the first smart contract). Therefore, the first smart contract remains deployed and, if desired, auditable following the upgrade because the first and second smart contracts both remain viewable/findable.

Optionally, a parent address 117 may be set in the second smart contract when it is deployed. The parent address 117 may point to the address of the first smart contract. The parent address 117 may enable the token history to be traversed in reverse chronological order, if desired.

It should be noted that the address of a smart contract (e.g., a security token 102) is different than the upgraded address 111 field in the smart contract. The address "of" a smart contract is the address at which the smart contract is stored on the distributed ledger. The upgraded address 111 is a field in the smart contract with a value that points to (the address of) a subsequent version of the smart contract.

FIG. 2A is a block diagram illustrating a data structure 110 used in the system 100 illustrated in FIG. 1. One or more data structures 110 may be stored in the data storage smart contract 128. Each data structure 110 may include one or more elements 223A-M, where each element 223 corresponds to (i.e., includes information about) a particular custodian 116, broker dealer 118, or investor 120. Optionally, security token elements 223 may also be stored in one or more data structures 110.

In some configurations, all elements 223 in a particular data structure 110 correspond to the same type of entity, e.g., all elements 223 correspond to investors 120 in the system 100. In this configuration, the data storage smart contract 128 may include a first data structure 110 for all investors 120, a second data structure 110 for all custodians 116, a third data structure 110 for all broker dealers 118, and/or a fourth data structure 110 for all security tokens 102 in the system 100. Alternatively, a particular data structure 110 may include elements 223 corresponding to different types of entities, i.e., investor element(s) 223, custodian element(s) 223, and broker dealer element(s) 223 may be included in a single data structure 110.

In some configurations, each element 223 may include two storage slots 215A-N where each storage slot is a fixed number of bytes. For example, a storage slot may be 32 bytes long (or any suitable length), e.g., each storage slot 215 may be slot in the Solidity programming language. Although each element 223 is illustrated in FIG. 2A as including two storage slots 215 (i.e., N=2M), an element 223 may include only a single storage slot 215 (i.e., N=M) or more than two storage slots 215 (i.e., N>2M).

Each storage slot 215 may include a key 219A-N and a value 221A-N, i.e., a key/value pair. Each key 219 may be a nested structure with a first level indicating the type of entity the element 223 corresponds to (e.g., custodian 116, broker dealer 118, investor 120, etc.) and a second level that indicates an address (e.g., Ethereum address) owned by the particular entity. In this way, the key 215 may be encoded (with the type of entity). Instead of indexing by address, the second level of the key 219 may be indexed in other ways, e.g., a hash of the entity/investor/security token name, etc. Optionally, the keys 219 may include more than two levels. If the element 223 includes two slots 215, the key 219 in the first storage slot 215 of the element 223 may be the same or different than the key 219 in the second slot 215 of the element 223.

The information included in the values 221 may vary depending on the type of entity the element 223 corresponds to. Each value 221 in the data structure 110 may be a nested structure with a first level indicating the type of entity the element 223 corresponds to (e.g., custodian 116, broker dealer 118, investor 120, etc.) and one or more additional levels indicating additional information. In this way, the value 221 may be encoded (with the type of entity) so that a computing device (e.g., a network node 140) will know how to interpret the data in the value 221. In other words, a computing device (e.g., a network node 140) will interpret the data in the value 221 differently based on the encoding, i.e., the type indicated in the value 221. Multiple parameters may be bit-shifted (and/or concatenated) so they fit in the same value 221.

For example, the value 221 in a first storage slot 215 in a particular investor element 223 may include one or more bits indicating "investor" in the first level and the PII hash for the investor 120 in the second level. Furthermore, the value 221 in the second storage slot 215 in the investor element 223 may include one or more bits indicating other attributes of the investor 120.

Examples of other data structures 110 include custodian elements 223, broker dealer elements 223, and/or optional security token elements 223. Each custodian element 223 may include attribute(s) about a particular custodian 116. Optionally, a custodian element 223 may reference an address (e.g., Ethereum address) of one or more investor elements 223, broker dealer elements 223, and/or security token elements 223 that the custodian element 223 is associated with. For example, a custodian element 223 may include an address (e.g., Ethereum address) of one or more broker dealers 118 that the custodian 116 is associated with.

Each broker dealer element 223 may include attribute(s) about a particular broker dealer 118. The value(s) 221 in a particular broker dealer element 223 may include one or more bits indicating "broker dealer" in the first level and one or more bits indicating attribute(s) about the broker dealer 118 in a second level. Optionally, a broker dealer element 223 may reference an address (e.g., Ethereum address) of one or more investor elements 223, custodian element 223, and/or security token elements 223 that the broker dealer element 223 is associated with. For example, a broker dealer element 223 may include an address (e.g., Ethereum address) of one or more custodians 116 that the broker dealer 118 is associated with.

Each security token element 223 may include attribute(s) about a particular security token 102. The value(s) 221 in an optional security token element 223 may include one or more bits indicating "security token" in the first level and one or more bits indicating attribute(s) about the security token 102 in a second level. Various types of information about the security token 102 may be included in the value(s) a security token element 223.

Each optional issuer element 223 may include attribute(s) about a particular issuer 114. The value(s) 221 in a particular optional issuer element 223 may include one or more bits indicating "issuer" in the first level and one or more bits indicating attribute(s) about the issuer 114 in a second level. Optionally, an issuer element 223 may reference addresses (e.g., Ethereum addresses) of one or more investors 120, custodians 116, broker dealers 118 and/or security token 102 that the issuer 114 is associated with.

Figure 2B:
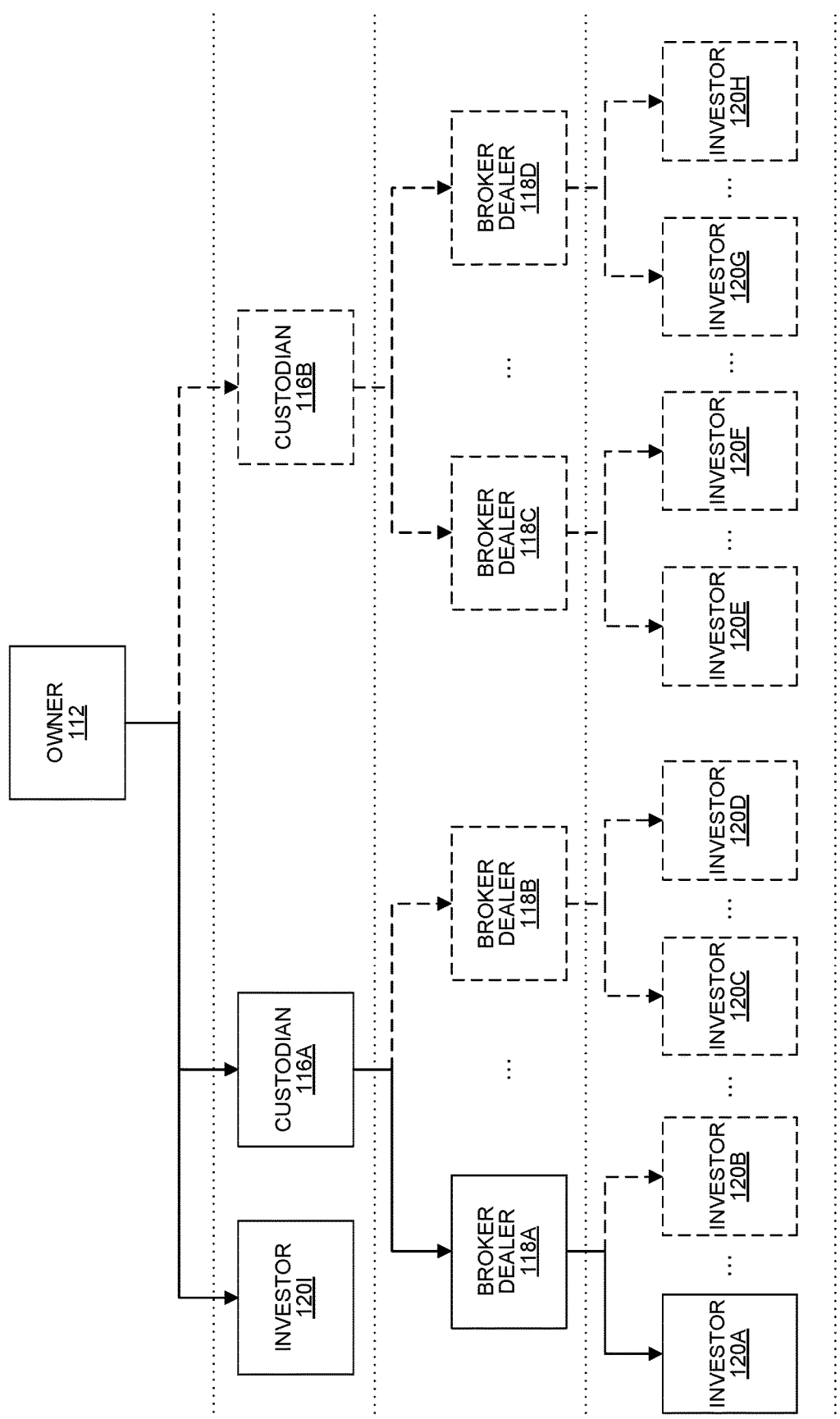
FIG. 2B is a block diagram illustrating a hierarchy of entities in the system illustrated in FIG. 1.

FIG. 2B is a block diagram illustrating a hierarchy of entities in the system 100 illustrated in FIG. 1. Specifically, FIG. 2B shows relationships between one or more investors 120, optional one or more broker dealers 118, optional one or more custodians 116, and/or one or more owners 112 of the system 100.

In examples, the hierarchy in FIG. 2B may define data permissions in the system 100. The hierarchy may be stored in any suitable form and/or may be implicit in the data stored in various elements 223.

A data structure 110 may store multiple investor elements 223 for an investor 120 that has accounts at multiple broker dealers 118. In examples, a first investor element 223A may describe a particular investor 120, according to data collected by a first broker dealer 118A, e.g., during onboarding performed by the first broker dealer 118A. Similarly, a different investor element 223B may describe the same particular investor 120, according to data collected by a different broker dealer 118B, e.g., during onboarding performed by the different broker dealer 118B. Additionally or alternatively, an investor element 1201 may be stored for an external investor that is not a customer of a broker dealer 118 or custodian 116.

Any smart contracts implementing the global registry 108 may be executed by a virtual machine (e.g., the Ethereum Virtual Machine) running on a network node 140. Each entity in the system 100 may have different data permissions to the data storage smart contract 128. In examples, the owner 112 may add, remove, and/or change elements for custodians 116, broker dealers 118 and/or investors 120 in its own hierarchy. A custodian 116 may add, remove, and/or change elements for broker dealers 118 and/or investors 120 in its own hierarchy. A broker dealer 118 may add, remove, and/or change elements for investors 120 in its own hierarchy. An owner 112 may add, remove, and/or change elements for custodians 116, broker dealers 118 and/or investors 120 in its own hierarchy. In some configurations, an investor 120 may have permission to call the transfer( ) method 109 that transfers funds and/or tokens between two addresses.

Figure 3:
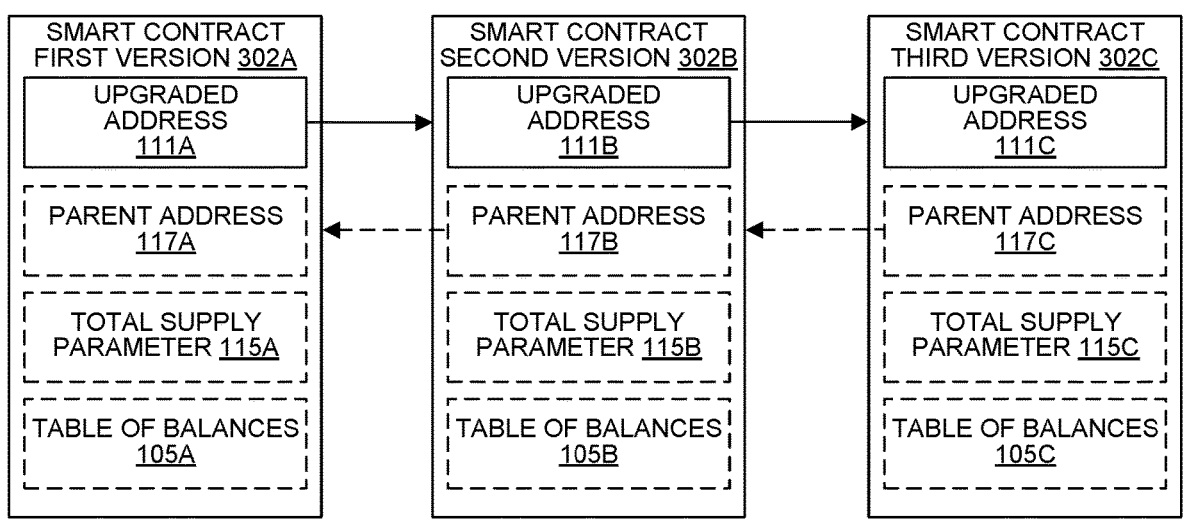
FIG. 3 is a block diagram illustrating three different versions of an upgradeable smart contract.

FIG. 3 is a block diagram illustrating three different versions 302A-C of an upgradeable smart contract. In other words, FIG. 3 illustrates a smart contract 302 that has been upgraded twice, resulting in a first version 302A of the smart contract, a second version 302B of the smart contract, and a third version 302C of the smart contract. In some configurations, the smart contracts 302 illustrated in FIG. 3 may implement security tokens 102 described above. Although not shown in FIG. 3, each smart contract 302 described herein may implement any or all of the same functionality, methods and/or parameters described for the security token 102 in FIG. 1.

Each smart contract 302 holds an address to its descendant, subsequent contract. This address may be stored in each smart contract 302 in a respective upgraded address 111A-C field. The upgraded address 111A in the first version 302A of the smart contract points to the address of the second version 302B of the smart contract, while the upgraded address 111B in the second version 302B of the smart contract points to the address of the third version 302C of the smart contract. In this way, the third version 302C is a child/descendent of the second version 302B, which is a child/descendent of the first version 302A.

Assuming the third version 302C of the smart contract is the current version, the upgraded address 111C of the third version 302C of the smart contract may be unset, e.g., all bits set to "O", all bits set to "1", or any other value that does not correspond to an address on the distributed ledger 122 on which the smart contract 302 is implemented. An unset upgraded address 111C signifies the third version 302C of the smart contract is the currently-active implementation of the smart contract 302, e.g., the latest-deployed version of the smart contract 302. In some configurations, the upgraded address 111 in a smart contract 302 may be set initially by the issuer 114 of the smart contract 302, e.g., by calling a method implemented in the smart contract 302 on the distributed ledger 122.

In some configurations, the upgraded address 111 field does not change once it has been set. Keeping the upgraded address 111 field in a smart contract 302 permanently set to point to the same subsequent version of the smart contract 302 ensures that the upgrade history of a smart contract 302 is auditable. To audit the upgrade path of the smart contract 302, the versions may be traversed backwards, e.g., from the third version 302C to the second version 302B to the first version 302A. Other than auditing, there is no need to traverse backwards through the lifetime of a smart contract 302 because the primary concern is whether the address they're pointed to is the active version of the smart contract 302, and if not, how to traverse to the active version.

Optionally, each smart contract 302 holds an address to its parent contract. This address may be stored in a parent address 117A-C field. Assuming the first version 302A of the smart contract is the earliest version, the optional parent address 117A in the first version 302A of the smart contract may be unset, e.g., all bits set to "0", all bits set to "1", or any other value that does not correspond to an address on the distributed ledger 122 on which the smart contract 302 is implemented. The optional parent address 117B in the second version 302B of the smart contract points to the address of the first version 302A of the smart contract, while the upgraded address 117C in the third version 302C of the smart contract points to the address of the second version 302B of the smart contract. In this way, the first version 302A is a parent of the second version 302B, which is a parent of the third version 302C.

In a first example, an event is emitted when a contract is upgraded, e.g., when an upgraded address 111 and/or a parent address 117 is set. In examples, devices (e.g., belonging to an investor 120, broker dealer 118, custodian, issuer 114, owner 112, or network node 140) may listen for such events. In examples, the events indicate the upgraded address 111 and/or a parent address 117 that was set. The child smart contract 302 may be called directly using the upgraded address 111 in an event.

In a second example, a calling device may optionally call the parent smart contract 302 to determine if the upgraded address 111 and/or a parent address 117 in the parent smart contract 302 is set. In examples, a getter function in a child smart contract 302 may return the parent address 117 (pointing to its parent), while a getter function in a parent smart contract 302 may return the upgraded address 111 (pointing to its child). In examples, such a function may return a zero address when the upgraded address 111 and/or a parent address 117 is not set.

In examples where the smart contract 302 implements a security token 102, each version of the smart contract 302 may include a token supply parameter 115. The token supply parameter 115 may indicate the total number of outstanding tokens in the security token 102/smart contract 302, e.g., the token supply parameter 115 may be the sum of token balances for all addresses in the table of balances 105 for the security token 102/smart contract 302.

Once a subsequent version of the smart contract 302 has been deployed, the issuer 114 (or owner 112) sets the total supply parameter 115 (for the subsequent version of the smart contract 302) to match the total supply parameter 115 of the parent version. In the example of FIG. 3, the total supply parameter 115B of the second version 302B of the smart contract may be set to equal the total supply parameter 115A of the first version 302A of the smart contract following deployment of the second version 302B of the smart contract. Similarly, the total supply parameter 115C of the third version 302C of the smart contract may be set to equal the total supply parameter 115B of the second version 302B of the smart contract following the subsequent deployment of the third version 302C of the smart contract.

In examples where the smart contract 302 implements a security token 102, each version 302 may also include a table of balances 105A-C that indicates the token balances and addresses for the issued tokens in each version of the security token 102/smart contract 302. The token balances and addresses in each table of balances 105 may be considered part of the state of the smart contract 302. As described in FIGS. 4A-D, the state/table of balances 105 of both the parent version and the child version of a smart contract may be updated to reflect the migration of tokens in the parent version to the child version.

FIGS. 4A-D are block diagrams illustrating different stages of a migration of tokens 102 to a subsequent version of a smart contract 302. In the example of FIGS. 4A-D, the smart contract 302 being upgraded is implementing a security token 102. Specifically, each of FIGS. 4A-D illustrate two tables of balances 105, the left table 105A implemented for (and tracking the tokens in) a parent smart contract 302 (that is being deprecated) and the right table 105B implemented for (and tracking the tokens in) a child smart contract 302, which is the subsequent version of the parent smart contract 302. Suppose that the address of the child smart contract 302 is address D. In other words, the child smart contract 302 is stored at address D of a distributed ledger 122.

FIG. 4A illustrates a first stage during the migration of tokens to a subsequent version of a smart contract 302. Initially, assume that the parent smart contract 302 (represented by the table of balances 105A on the left) includes 450 outstanding tokens (total supply parameter 115 is equal to 450). The outstanding tokens in the parent smart contract 302 may be spread out among three different addresses: address A with 100, address B with 150, and address C with 200.

Following deployment of the child smart contract 302, the issuer 114 (or owner 112) could either allow or restrict tokens in the parent smart contract 302 from trading. Restricting trading may force an upgrade by restricting all trades from occurring within the parent smart contract 302 unless the recipient is the address matching the address in the upgraded address 111 field (address D in this example). In other words, restricting trading means that holders of tokens in the parent smart contract 302 can only transfer their holdings to the child smart contract 302. Following migration, the child smart contract 302 (at address D) would become a holder within the parent smart contract 302. This provides pseudo-burn functionality as holders migrate/transfer their tokens to address (address D) of the child smart contract 302, while also providing a full audit trail of the transition of tokens during an upgrade.

When the child smart contract 302 is first deployed (represented by the table of balances 105B on the right), it does not have any outstanding tokens (total supply parameter 115 is equal to 0) or token holders, so the table of balances 105B would be empty. New tokens are then issued in the child smart contract (equal in number to the total supply parameter 115 of the parent smart contract 302: 450) as part of the upgrade process, e.g., 450 new tokens are issued in the child smart contract 302 to the address of the issuer 114. As old tokens (in the parent smart contract 302) are migrated to address D, corresponding new tokens (in the child smart contract 302) are transferred from the issuer's address to the token holder addresses.

FIGS. 4B-D illustrate the migration path of old tokens (in the parent smart contract 302) held in three addresses (A, B, and C) to the address of the child smart contract 302 (address D), and corresponding transfer of new tokens (in the child smart contract 302) from the issuer's address to the three addresses (A, B, and C). It should be noted that, instead of restricting tokens in the parent smart contract 302 from trading, the issuer 114 could allow the parent smart contract 302 to continue trading. If the parent smart contract 302 continues to trade, the tokens in the parent smart contract 302 may be transferred to addresses other than the address of the child smart contract 302 (address D). For example, if the issuer 114 allows the parent smart contract 302 to continue trading, the token holder associated with address A may transfer 50 of their tokens to address B (instead of address D).

Future upgrades would follow the same flow as described in association with FIGS. 4A-D, with the issuer 114 able to allow tokens in an obsolete, parent smart contract to actively trade (or not). The enforcement (of whether the tokens in the parent smart contract 302 are allowed to continue trading) may occur in (1) compliance rule(s) 106A implemented in the token 102/smart contract 302 itself; and/or (2) compliance-rule(s) 106B implemented externally to the token 102/smart contract 302. In other words, a compliance rule in (or otherwise associated with) the parent/deprecated token 102 is enforced, in response to an upgrade being forced, that requires all token transactions be sent to the address of the child smart contract 302 (address D). In some configurations, the compliance rule 106 may determine whether the tokens in the parent smart contract 302 are allowed to continue trading by determining whether the upgraded address 111 field is set (indicating that trading is restricted) or unset (indicating that trading is allowed).

FIG. 4B illustrates a second stage during the migration of tokens 102 during which 100 tokens are migrated from address A to address D. In other words, the holder (associated with address A) migrates their 100 old tokens in the parent smart contract 302 to address D of the child smart contract 302. This effectively burns these 100 old tokens in the parent smart contract 302 because they will never be transferred out of address D. In examples, the migration of old tokens (e.g., from address A, B, or C to address D) may include invoking a transfer method implemented in the parent smart contract 302 on the distributed ledger 122. The transfer method may be invoked by the issuer 114, the owner 112, or the token holder associated with the transferring address.

In addition to migrating old tokens from token holder addresses to address D in the parent smart contract 302, corresponding new tokens in the child smart contract 302 are transferred from the issuer's address to the token holder addresses. In examples, enough new tokens are issued in the child smart contract 302 (during the upgrade process) to the issuer's address to replace all the old tokens in the parent smart contract 302, e.g., 450 new tokens are issued in the child smart contract 302 to the issuer's address. In examples, all new tokens (in the child smart contract 302) are issued at one time. Then, as the old tokens (in the parent smart contract 302) are migrated from a token holder address to the address of the child smart contract 302 (address D), a corresponding number of new tokens (in the child smart contract 302) are transferred from the issuer's address to the token holder address.

Accordingly, after 100 old tokens (in the parent smart contract 302) are transferred from address A to address D, a corresponding 100 new tokens (in the child smart contract 302) may be transferred from the issuer's address to address A. In examples, the address of the transfer method invocation sending the old tokens to address D may be used as the output address for the transfer of new tokens from the issuer's address.

FIG. 4C illustrates a third stage during the migration of tokens 102 during which 150 tokens are migrated from address B to address D. In other words, a holder (associated with address B) migrates their 150 old tokens in the parent smart contract 302 to address D of the child smart contract 302, effectively burning these 150 old tokens. In examples, this migration includes the issuer 114, owner 112, or the token holder (associated with the transferring address) invoking a transfer method implemented in the parent smart contract 302 on the distributed ledger 122. Following this migration of 150 old tokens, address D (of the parent smart contract 302) may hold 250 of the old tokens in the parent smart contract 302: 100 from address A and 150 from address B. Additionally, a corresponding 150 new tokens in the child smart contract 302 may be transferred from the issuer's address to address B. At that point, the issuer's address holds 200 remaining new tokens (450—100 to address A-150 to address B).

FIG. 4D illustrates a fourth stage during the migration of tokens 102 during which 200 tokens are migrated from address C to address D. In other words, a holder (associated with address C) migrates their 200 old tokens in the parent smart contract 302 to address D of the child smart contract 302, effectively burning these 200 old tokens. In examples, this migration includes the issuer 114, owner 112, or the token holder (associated with the transferring address) invoking a transfer method implemented in the parent smart contract 302 on the distributed ledger 122. Following this migration of 200 old tokens, the final state of the parent smart contract 302 has a single holder, address D (of the child smart contract 302), which holds the total supply of 450 of the old tokens in the parent smart contract 302: 100 from address A, 150 from address B, and 200 from address C. This essentially locks/burns the old tokens in the parent smart contract 302, while proving they have been migrated to the child smart contract 302.

Additionally, a corresponding 200 new tokens in the child smart contract 302 may be transferred from the issuer's address to address C. At that point, the issuer's address holds zero new tokens, and the issuer's address may optionally be removed from the table of balances 105B.

FIG. 5 is a flow diagram illustrating a method 500 for deploying a child smart contract 302. The method 500 may be executed by at least one processor running a virtual machine in the system 100, e.g., at least one processor in a network node 140. The method 500 may include executing one or more methods implemented in a security token 102/smart contract 302, e.g., stored in a distributed ledger 122. Additionally, the method 500 may utilize one or more parameters in a security token 102/smart contract 302, e.g., stored in a distributed ledger 122.

The method 500 begins at step 502 where the at least one processor deploys a child smart contract 302, which is a subsequent version (also referred to as a "child") of a parent smart contract 302, on a distributed ledger 122. Even though it is not the currently-implemented version, the parent smart contract 302 remains deployed after the child smart contract 302 has been deployed in order to maintain auditability. In examples, the child smart contract 302 is deployed by storing the child smart contract 302 on a distributed ledger 122 and calling an upgrade method implemented in the parent smart contract 302, e.g., which is also implemented on the distributed ledger 122. The upgrade method may be called by the owner 112 or the issuer 114 of the parent smart contract 302.

The method 500 proceeds at step 504 where the at least one processor sets an upgraded address 111 field in the parent smart contract 302 to point to an address of the child smart contract 302. Each smart contract 302 may include an address to its child smart contract 302, if any. For smart contracts 302 without a child smart contract 302 (i.e., the smart contract 302 is the currently-active implementation of the smart contract 302), the upgraded address 111 field may be unset, e.g., all bits set to "0", all bits set to "1", or any other value that does not correspond to an address on the distributed ledger 122 on which the smart contract 302 is implemented. The upgraded address 111 in a smart contract 302 may be set by the issuer 114 of the smart contract 302, e.g., by calling a method implemented in the smart contract 302 on the distributed ledger 122.

In some configurations, the upgraded address 111 field does not change once it has been set. Keeping the upgraded address 111 field in a smart contract 302 permanently set to point to the same subsequent version of the smart contract 302 ensures that the upgrade history of a smart contract 302 is auditable.

The method 500 proceeds at optional step 506 where the at least one processor initiates an event indicating that the upgraded address 111 field (of the parent smart contract 302) has been set, e.g., an Ethereum event. In examples, the event may indicate the upgraded address 111 and optionally the address of the parent smart contract 302. In examples, these events are broadcast to the network of nodes 140 implementing the distributed ledger 122. In examples, devices (e.g., belonging to an investor 120, broker dealer 118, custodian, issuer 114, owner 112, or network node 140) may listen for such events.

The method 500 proceeds at step 508 where the at least one processor sets a parent address 117 field in the child smart contract 302 to point to an address of the parent smart contract 302. Each smart contract 302 may include an address to its parent smart contract 302, if any. For smart contracts 302 without a parent smart contract 302 (i.e., the smart contract 302 is the earliest version of the smart contract 302), the parent address 117 field may be unset, e.g., all bits set to "0", all bits set to "1", or any other value that does not correspond to an address on the distributed ledger 122 on which the smart contract 302 is implemented. The parent address 117 in a smart contract 302 may be set by the issuer 114 of the smart contract 302, e.g., by calling a method implemented in the smart contract 302 on the distributed ledger 122.

The method 500 proceeds at optional step 510 where the at least one processor initiates an event indicating that the parent address 117 field (of the child smart contract 302) has been set, e.g., an Ethereum event. In examples, the event may indicate the parent address 117 and optionally the address of the child smart contract 302. In examples, these events are broadcast to the network of nodes 140 implementing the distributed ledger 122. In examples, devices (e.g., belonging to an investor 120, broker dealer 118, custodian, issuer 114, owner 112, or network node 140) may listen for such events.

The method 500 proceeds at optional step 512 where the at least one processor sets a token supply parameter 115 in the child smart contract 302 to equal the token supply parameter 115 in the parent smart contract 302. In examples, optional step 512 is only performed for configurations where the smart contract 302 implements a security token 102. In such configurations, the token supply parameter 115 may indicate the total number of outstanding tokens in a smart contract 302, e.g., the token supply parameter 115 may be the sum of token balances for all addresses in a table of balances 105 for the smart contract 302. In contrast, if the smart contract 302 in the method 500 does not implement a security token 102, optional step 512 is not performed.

FIG. 6 is a flow diagram illustrating a method 600 for migrating outstanding tokens in a parent smart contract 302 to a child smart contract 302. The method 600 may be executed by at least one processor running a virtual machine in the system 100, e.g., at least one processor in a network node 140. The method 600 may include executing one or more methods implemented in a security token 102/smart contract 302, e.g., stored in a distributed ledger 122. Additionally, the method 600 may utilize one or more parameters in a security token 102/smart contract 302, e.g., stored in a distributed ledger 122.

The method 600 in FIG. 6 is performed where the parent smart contract 302 and the child smart contract 302 each implement a respective security token 102. In some configurations, the method 600 of FIG. 6 may be performed sequentially to the method 500 of FIG. 5, e.g., after a child smart contract 302 has been deployed. Accordingly, the parent smart contract 302 and the child smart contract 302 in the method 600 of FIG. 6 may be the same as the parent smart contract 302 and the child smart contract 302 described in the method 500 of FIG. 5, respectively. In some configurations, the method 500 of FIG. 5 and/or the method 600 of FIG. 6 are initiated in response to the issuer 114 (of the parent smart contract 302) calling an upgrade method implemented in the parent smart contract 302, e.g., which is also implemented on the distributed ledger 122.

The method 600 begins at optional step 602 where the at least one processor determines whether old tokens in a parent smart contract 302 are restricted from trading following deployment of a child smart contract 302. In examples, the issuer 114 makes the decision to allow or restrict or allow further trading of the parent smart contract 302. If trading is restricted, all transactions of old tokens in the parent smart contract 302 must use an address of the child smart contract 302 as the output address of the transaction, e.g., address D in the examples of FIGS. 4A-D. In contrast, if the issuer 114 allows the parent smart contract 302 to continue trading, the old tokens in the parent smart contract 302 may be transferred to addresses other than the address (address D) of the child smart contract 302.

The enforcement (of whether the old tokens in the parent smart contract 302 are allowed to continue trading) may occur in (1) compliance rule(s) 106A implemented in the security token 102/smart contract 302 itself; and/or (2) compliance-rule(s) 106B implemented externally to the security token 102/smart contract 302. For example, the issuer 114 may call a method implemented in the parent smart contract 302 to indicate (e.g., in a compliance rule 106) that trading of old tokens in the parent smart contract 302 are restricted/an upgrade is being forced, after which the at least one processor checks for this indication when a transfer/transaction of old token(s) in the parent smart contract 302 is initiated. In some configurations, the compliance rule 106 may determine whether the tokens in the parent smart contract 302 are allowed to continue trading by determining whether the upgraded address 111 field is set (indicating that trading is restricted) or unset (indicating that trading is allowed) in the parent smart contract 302. In some configurations, the remaining steps in the method 600 are performed only based on (e.g., in response to) determining that the old tokens in the parent smart contract 302 are restricted from trading, e.g., following deployment of the child smart contract 302.

The method 600 proceeds at step 604 where the at least one processor issues new tokens in the child smart contract 302 to an intermediate address. In examples, the number of new tokens issued in the child smart contract is equal to the total supply parameter 115 of the parent smart contract 302. In examples, the intermediate address is the address of the issuer 114. In other words, the new tokens may be issued in the child smart contract 302 and initially held in the issuer's address.

The method 600 proceeds at step 606 where the at least one processor migrates all old tokens, in the parent smart contract 302, from a token holder address to an address of the child smart contract 302. The parent smart contract 302 may include a table of balances 105 (on a distributed ledger 122) that indicates token balances of all addresses holding old tokens in the parent smart contract 302, e.g., the table of balances 105 may indicate what addresses (e.g., Ethereum addresses) hold what quantity of tokens in the parent smart contract 302. Similarly, the child smart contract 302 may include a table of balances 105 (on the distributed ledger 122) that indicates token balances of all addresses holding old tokens in the child smart contract 302.

In order to perform the migration in step 606, the at least one processor may perform a transfer of the old tokens in the token holder address to the address of the child smart contract 302. This may include invoking a transfer method implemented in the parent smart contract 302 on the distributed ledger 122, e.g., invoked by the issuer 114, the owner 112, or the token holder associated with the transferring address.

The method 600 proceeds at step 608 where the at least one processor transfers at least one new token in the child smart contract 302 from the intermediate address to the token holder address. For example, if 100 old tokens (in the parent smart contract 302) were migrated from the token holder address in step 606, 100 new tokens (in the child smart contract 302) are transferred from the intermediate address to the token holder address in step 608.

The method 600 proceeds at optional step 610 where the at least one processor determines if old tokens in any remaining token holder addresses have not yet been migrated. If there are old tokens that have not yet been migrated, the method proceeds at optional step 612 where the at least one processor selects a new token holder address and iterates through steps 606 and 608 again for the new token holder address.

Following the final performance of step 608 for the parent smart contract 302, the final state of the parent smart contract 302 has a single address (the address of the child smart contract 302) holding the total supply of old tokens in the parent smart contract 302. This essentially locks/burns the holdings of the parent smart contract 302, while proving the tokens have been migrated to the child smart contract 302. Following the final performance of step 608, the issuer's address typically does not hold any new tokens.

If there are no more old tokens to migrate in step 610 (or step 610 is not performed), the method 600 may end in step 614. FIG. 6 illustrates the method 600 being performed iteratively for each address holding tokens in the parent smart contract 302. Alternatively, step 606 may be performed to migrate the tokens for all token holder addresses holding tokens in the parent smart contract/security token 102, and step 608 may be performed to transfer new security tokens from the intermediate address to all token holder addresses, i.e., without iterating performing steps 606-608 for each token holder address before moving onto the next token holder address.

Following the method 500 and/or the method 600, the child smart contract 302 may be called. In a first example, an event is emitted when a contract is upgraded, e.g., when an upgraded address 111 and/or a parent address 117 is set as in steps 504 and 508. In examples, devices (e.g., belonging to an investor 120, broker dealer 118, custodian, issuer 114, owner 112, or network node 140) may listen for such events. In examples, the events indicate the upgraded address 111 and/or a parent address 117 that was set. The child smart contract 302 may be called directly using the upgraded address 111 in an event. A calling device may call methods implemented in the child smart contract 302 using the upgraded address (the address of the child smart contract 302) in an event.

Alternatively, a calling device may optionally call the parent smart contract 302 to determine if the upgraded address 111 in the parent smart contract 302 is set. In examples, a getter function in a parent smart contract 302 may return the upgraded address 111 (pointing to its child smart contract 302). In examples, such a function may return a zero address when the upgraded address 111 and/or a parent address 117 is not set.

Computer System Overview

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is a block diagram illustrating an example computer system 700 with which embodiments of the present disclosure may be utilized. According to the present example, the computer system 700 includes an interconnect 702, at least one processor 704, at least one communication port 706, at least one main memory 708, at least one removable storage media 710, at least one read only memory 712, and at least one mass storage device 714.

The at least one processor 704 can be any known processor. The at least one communication port 706 can be or include, In examples, any of an RS-232 port for use with a modem-based dialup connection, a 10/100 Ethernet port, or a Gigabit port using copper or fiber. The nature of the at least one communication port 706 may be chosen depending on a network such as a Local Area Network (LAN), Wide Area Network (WAN), or any network to which the computer system 700 connects. The at least one main memory 708 can be Random Access Memory (RAM), or any other dynamic storage device(s) commonly known in the art. The at least one read only memory 712 can be any static storage device(s) such as Programmable Read Only Memory (PROM) chips for storing static information such as instructions for the at least one processor 704.

The at least one mass storage device 714 can be used to store information and instructions. In examples, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 702 can be or include one or more buses, bridges, controllers, adapters, and/or point-to-point connections. Interconnect 702 communicatively couples the at least one processor 704 with the other memory, storage, and communication blocks. Interconnect 702 can be a PCI/PCI-X or SCSI based system bus depending on the storage devices used. The at least one removable storage media 710 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

FIG. 8 is a block diagram illustrating another example computing device 800 with which embodiments of the present disclosure may be utilized. The example computing device 800 may be used to implement any of the global registry 108, owner 112, issuer 114, custodian 116, broker dealer 118, investor 120, one of the network nodes 140 storing a copy of the distributed ledger 122, security token exchange 124, and/or a virtual machine (e.g., Ethereum Virtual Machine) executing any of the smart contracts described herein. The computing device 800 includes at least one memory 802, at least one processor 804, optional at least one network interface 806, optional display device 808, optional input device 810, and optional power source 812.

In examples, the at least one memory 802 can be any device, mechanism, or populated data structure used for storing information. In examples, the at least one memory 802 can be or include any type of volatile memory, non-volatile memory, and/or dynamic memory. In examples, the at least one memory 802 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 802 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 802. The at least one memory 802 may be used to store instructions for running one or more applications or modules on the at least one processor 804. In examples, the at least one memory 802 could be used in one or more examples to house all or some of the instructions needed to execute the functionality discussed herein, e.g., in FIGS. 3-4.

The at least one processor 804 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality disclosed herein (e.g., in FIGS. 3-4) may be implemented by the at least one processor 804 and the at least one memory 802.

In examples, the at least one optional network interface 806 includes or is coupled to at least one optional antenna for communication with a network (such as one of the at least one networks 112 of system 100). In examples, the at least one optional network interface 806 includes at least one of an Ethernet interface, a cellular radio access technology (RAT) radio, a Wi-Fi radio, a Bluetooth radio, or a near field communication (NFC) radio. In examples, the at least one optional network interface 806 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 806 includes a Wi-Fi (IEEE 802.11) radio configured to communicate with a wireless local area network that communicates with the remote server, rather than a wide area network. In examples, the at least one optional network interface 806 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 808 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 810 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 808 is combined with the optional at least one input device 810 into a human machine interface (HMI) for user interaction with the computing device 800. In examples, at least one optional power source 812 is used to provide power to the various components of the computing device 800.

Terminology

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". In examples, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, In examples, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, In examples, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for an upgradeable security token. While detailed descriptions of one or more embodiments of the disclosure have been given above, various alternatives, modifications, and equivalents will be apparent to those skilled in the art without varying from the spirit of the disclosure. In examples, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a network node comprising: at least one processor; at least one memory communicatively coupled to the at least one processor; at least one network interface communicatively couple to the at least one processor; wherein the network node is configured to be within a plurality of network nodes communicatively coupled in a peer-to-peer network of network nodes implementing a distributed ledger; wherein the network node is communicatively coupled to at least one remotely located computing device through the at least one network interface; wherein the at least one processor is configured to: deploy a child smart contract, which is a subsequent version of a parent smart contract, on the distributed ledger; and set an upgraded address field in the parent smart contract to point to an address of the child smart contract; wherein the parent smart contract remains deployed after the child smart contract is deployed.

Example 2 includes the network node of Example 1, wherein the at least one processor is further configured to initiate an event indicating that the upgraded address field has been set.

Example 3 includes the network node of any of Examples 1-2, wherein the at least one processor is further configured to: set a parent address field in the child smart contract to point to an address of the parent smart contract; and initiate an event indicating that the upgraded address field has been set.

Example 4 includes the network node of any of Examples 1-3, wherein the at least one processor is further configured to set a token supply parameter in the child smart contract to equal a token supply parameter in the parent smart contract.

Example 5 includes the network node of any of Examples 1-4, wherein the at least one processor is further configured to migrate all old tokens in the parent smart contract from a token holder address to an address of the child smart contract.

Example 6 includes the network node of Example 5, wherein the at least one processor is further configured to issue at least one new token in the child smart contract to the token holder address.

Example 7 includes the network node of Example 6, wherein the at least one processor is further configured to: determine if there are old tokens in at least one other token holder address that need to be migrated; issue new tokens in the child smart contract to an intermediate address; select a new token holder address from the at least one other token holder address; migrate old tokens in the parent smart contract from the new token holder address to the address of the child smart contract; and transfer at least one new token in the child smart contract from the intermediate address to the new token holder address.

Example 8 includes the network node of any of Examples 6-7, wherein the at least one processor is further configured to migrate all old tokens and transfer at least one new token based on determining that old tokens in the parent smart contract are restricted from trading following deployment of the child smart contract.

Example 9 includes the network node of any of Examples 6-8, wherein the at least one processor is further configured to determine that old tokens in the parent smart contract are restricted from trading based on whether the upgraded address field in the parent smart contract is set or unset.

Example 10 includes the network node of any of Examples 1-9, wherein the old tokens and new tokens are cryptographic tokens that each represents an external, tradable asset.

Example 11 includes the network node of any of Examples 1-10, wherein the parent smart contract and the child smart contract are implemented using respective originating smart contracts.

Example 12 includes a computerized method for upgrading a parent smart contract, wherein the computerized method is performed by a network node configured to be included within a plurality of network nodes in a peer-to-peer network of network nodes implementing a distributed ledger, wherein the network node is configured to be communicatively coupled to other network nodes in the peer-to-peer network, the computerized method comprising: deploying a child smart contract, which is a subsequent version of the parent smart contract, on the distributed ledger; and setting an upgraded address field in the parent smart contract to point to an address of the child smart contract; wherein the parent smart contract remains deployed after the child smart contract is deployed.

Example 13 includes the computerized method of Example 12, further comprising initiating an event indicating that the upgraded address field has been set.

Example 14 includes the computerized method of any of Examples 12-13, further comprising: setting a parent address field in the child smart contract to point to an address of the parent smart contract; and initiating an event indicating that the upgraded address field has been set.

Example 15 includes the computerized method of any of Examples 12-14, further comprising setting a token supply parameter in the child smart contract to equal a token supply parameter in the parent smart contract.

Example 16 includes the computerized method of any of Examples 12-15, further comprising migrating all old tokens in the parent smart contract from a token holder address to an address of the child smart contract.

Example 17 includes the computerized method of Example 16, further comprising issuing at least one new token in the child smart contract to the token holder address.

Example 18 includes the computerized method of Example 17, further comprising: determining if there are old tokens in at least one other token holder address that need to be migrated; issuing new tokens in the child smart contract to an intermediate address; selecting a new token holder address from the at least one other token holder address; migrating old tokens in the parent smart contract from the new token holder address to the address of the child smart contract; and transfer at least one new token in the child smart contract from the intermediate address to the new token holder address.

Example 19 includes the computerized method of any of Examples 17-18, further comprising migrating all old tokens and transfer at least one new token based on determining that old tokens in the parent smart contract are restricted from trading following deployment of the child smart contract.

Example 20 includes the computerized method of any of Examples 17-19, further comprising determining that old tokens in the parent smart contract are restricted from trading based on whether the upgraded address field in the parent smart contract is set or unset.

Example 21 includes the computerized method of any of Examples 12-20, wherein the old tokens and new tokens are cryptographic tokens that each represents an external, tradable asset.

Example 22 includes the computerized method of any of Examples 12-21, wherein the parent smart contract and the child smart contract are implemented using respective originating smart contracts.

Example 23 includes a network node comprising: at least one processor; at least one memory communicatively coupled to the at least one processor; at least one network interface communicatively couple to the at least one processor; wherein the network node is configured to be within a plurality of network nodes communicatively coupled in a peer-to-peer network of network nodes implementing a distributed ledger; wherein the network node is configured to be communicatively coupled to at least one remotely located computing device through the at least one network interface; wherein the at least one processor is configured to: deploy a child smart contract, which is a subsequent version of a parent smart contract, on the distributed ledger; set an upgraded address field in the parent smart contract to point to an address of the child smart contract; issue new tokens in the child smart contract to an intermediate address; migrate all old tokens in the parent smart contract from a token holder address to an address of the child smart contract; and transfer at least one new token in the child smart contract from the intermediate address to the token holder address; wherein the parent smart contract remains deployed after the child smart contract is deployed; and wherein the old tokens and new tokens are cryptographic tokens that each represents an external, tradable asset.

Example 24 includes the network node of Example 23, wherein the at least one processor is further configured to set a token supply parameter in the child smart contract to equal a token supply parameter in the parent smart contract.

Example 25 includes the network node of any of Examples 23-24, wherein the at least one processor is further configured to migrate all old tokens and transfer at least one new token based on determining that old tokens in the parent smart contract are restricted from trading following deployment of the child smart contract.

Example 26 includes the network node of any of Examples 23-25, wherein the at least one processor is further configured to determine that old tokens in the parent smart contract are restricted from trading based on whether the upgraded address field in the parent smart contract is set or unset.

What is claimed is:

1. A network node comprising:
   at least one processor;
   at least one memory communicatively coupled to the at least one processor;
   at least one network interface communicatively coupled to the at least one processor;
   wherein the network node is configured to be within a plurality of network nodes communicatively coupled in a peer-to-peer network of network nodes implementing a distributed ledger;
   wherein the network node is communicatively coupled to at least one remotely located computing device through the at least one network interface;
   wherein the at least one processor is configured to:
      deploy a child smart contract at a second address on the distributed ledger, wherein the child smart contract is a subsequent version of a parent smart contract at a first address on the distributed ledger;
      wherein a first table of balances is in the parent smart contract and a second table of balances is in the child smart contract, wherein the first table of balances comprises a plurality of indices each associated with a respective address/value pair of a plurality of address/value pairs, where each respective address in each of the plurality of address/value pairs is an address on the distributed ledger and a corresponding value in each of the plurality of address/value pairs is a number of tokens issued by the parent smart contract and held in the respective address;

set an upgraded address field in the parent smart contract to point to the second address;

subtract a particular number of tokens from a third value corresponding to a third address in the first table of balances; and add the particular number of tokens to a second value corresponding to the second address in the first table of balances;

wherein the particular number of tokens in the parent smart contract are removed from circulation after they are added to the second value corresponding to the second address in the first table of balances.

2. The network node of claim 1, wherein the at least one processor is further configured to initiate an event indicating that the upgraded address field has been set.

3. The network node of claim 1, wherein the at least one processor is further configured to:

set a parent address field in the child smart contract to point to the first address of the parent smart contract; and initiate an event indicating that the upgraded address field has been set.

4. The network node of claim 1, wherein the at least one processor is further configured to set a first token supply parameter in the child smart contract to equal a second token supply parameter in the parent smart contract.

5. The network node of claim 1, wherein the at least one processor is further configured to issue at least one new token in the child smart contract by modifying the second table of balances in the child smart contract, each of the at least one new token representing a respective external, tradeable asset.

6. The network node of claim 5, wherein the at least one processor is further configured to:

determine if there are any old tokens in at least one other token holder address that need to be migrated;

issue new tokens in the child smart contract to an intermediate address;

select a new token holder address from the at least one other token holder address;

migrate the old tokens in the parent smart contract from the new token holder address to the second address; and transfer the at least one new token in the child smart contract from the intermediate address to the new token holder address.

7. The network node of claim 6, wherein the at least one processor is further configured to migrate all of the old tokens and transfer the at least one new token based on determining that the old tokens in the parent smart contract are restricted from trading following deployment of the child smart contract.

8. The network node of claim 6, wherein the at least one processor is further configured to determine that the old tokens in the parent smart contract are restricted from trading based on whether the upgraded address field in the parent smart contract is set or unset.

9. The network node of claim 1, wherein the parent smart contract and the child smart contract are implemented using respective originating smart contracts.

10. A computerized method for upgrading a parent smart contract, wherein the computerized method is performed by a network node configured to be included within a plurality of network nodes in a peer-to-peer network of network nodes implementing a distributed ledger, wherein the network node is configured to be communicatively coupled to other network nodes in the peer-to-peer network, the computerized method comprising:

deploying a child smart contract at a second address on the distributed ledger, wherein the child smart contract is a subsequent version of the parent smart contract at a first address on the distributed ledger;

wherein a first table of balances is in the parent smart contract and a second table of balances is in the child smart contract, wherein the first table of balances comprises a plurality of indices each associated with a respective address/value pair of a plurality of address/value pairs, where each respective address in each of the plurality of address/value pairs is an address on the distributed ledger and a corresponding value in each of the plurality of address/value pairs is a number of tokens issued by the parent smart contract and held in the respective address;

setting an upgraded address field in the parent smart contract to point to the second address; and subtracting a particular number of tokens from a third value corresponding to a third address in the first table of balances; and adding the particular number of tokens to a second value corresponding to the second address in the first table of balances;

wherein the particular number of tokens in the parent smart contract are removed from circulation after they are added to the second value corresponding to the second address in the first table of balances.

11. The computerized method of claim 10, further comprising initiating an event indicating that the upgraded address field has been set.

12. The computerized method of claim 10, further comprising:

setting a parent address field in the child smart contract to point to the first address of the parent smart contract; and initiating an event indicating that the upgraded address field has been set.

13. The computerized method of claim 10, further comprising setting a first token supply parameter in the child smart contract to equal a second token supply parameter in the parent smart contract.

14. The computerized method of claim 10, further comprising issuing at least one new token in the child smart contract by modifying the second table of balances in the child smart contract, each of the at least one new token representing a respective external, tradeable asset.

15. The computerized method of claim 14, further comprising:

determining if there are any old tokens in at least one other token holder address that need to be migrated;

issuing new tokens in the child smart contract to an intermediate address;

selecting a new token holder address from the at least one other token holder address;

migrating the old tokens in the parent smart contract from the new token holder address to the second address; and transfer the at least one new token in the child smart contract from the intermediate address to the new token holder address.

16. The computerized method of claim 15, further comprising migrating all of the old tokens and transfer the at least one new token based on determining that the old tokens in the parent smart contract are restricted from trading following deployment of the child smart contract.

17. The computerized method of claim 15, further comprising determining that the old tokens in the parent smart contract are restricted from trading based on whether the upgraded address field in the parent smart contract is set or unset.

18. The computerized method of claim 10, wherein the parent smart contract and the child smart contract are implemented using respective originating smart contracts.

19. A network node comprising:
at least one processor;
at least one memory communicatively coupled to the at least one processor;
at least one network interface communicatively coupled to the at least one processor;
wherein the network node is configured to be within a plurality of network nodes communicatively coupled in a peer-to-peer network of network nodes implementing a distributed ledger;
wherein the network node is configured to be communicatively coupled to at least one remotely located computing device through the at least one network interface;
wherein the at least one processor is configured to:
deploy a child smart contract at a second address on the distributed ledger, wherein the child smart contract is a subsequent version of a parent smart contract at a first address on the distributed ledger;
wherein a first table of balances is in the parent smart contract and a second table of balances is in the child smart contract, wherein the first table of balances comprises a plurality of indices each associated with a respective address/value pair of a plurality of address/value pairs, where each respective address in each of the plurality of address/value pairs is an address on the distributed ledger and a corresponding value in each of the plurality of address/value pairs is a number of tokens issued by the parent smart contract and held in the respective address;
set an upgraded address field in the parent smart contract to point to the second address;
issue new tokens in the child smart contract to an intermediate address by modifying the second table of balances in the child smart contract;
subtract a particular number of tokens from a third value corresponding to a third address in the first table of balances;
add the particular number of tokens to a second value corresponding to the second address in the first table of balances;
wherein the particular number of tokens in the parent smart contract are removed from circulation after they are added to the second value corresponding to the second address in the first table of balances;
transfer at least one new token in the child smart contract from the intermediate address to a token holder address; and
wherein the new tokens are cryptographic tokens that each represents an external, tradeable asset.

20. The network node of claim 19, wherein the at least one processor is further configured to set a first token supply parameter in the child smart contract to equal a second token supply parameter in the parent smart contract.

21. The network node of claim 19, wherein the at least one processor is further configured to migrate all of the old tokens and transfer the at least one new token based on determining that the old tokens in the parent smart contract are restricted from trading following deployment of the child smart contract.

22. The network node of claim 19, wherein the at least one processor is further configured to determine that old tokens in the parent smart contract are restricted from trading based on whether the upgraded address field in the parent smart contract is set or unset.

23. The network node of claim 1, wherein the at least one processor is further configured to return the second address in response to receiving a request to determine whether the upgraded address field in the parent smart contract is set.

24. The computerized method of claim 10, further comprising returning the second address in response to receiving a request to determine whether the upgraded address field in the parent smart contract is set.

25. The network node of claim 19, wherein the at least one processor is further configured to return the second address in response to receiving a request to determine whether the upgraded address field in the parent smart contract is set.

* * * * *